US012009708B2

United States Patent
Goto et al.

(10) Patent No.: US 12,009,708 B2
(45) Date of Patent: Jun. 11, 2024

(54) ROTARY ELECTRIC MACHINE, STATOR THEREOF AND MANUFACTURING METHOD THEREOF

(71) Applicant: DENSO CORPORATION, Kariya (JP)

(72) Inventors: Mai Goto, Kariya (JP); Masayoshi Yamamoto, Kariya (JP); Shigenori Yoneda, Kariya (JP)

(73) Assignee: DENSO CORPORATION, Kariya (JP)

( * ) Notice: Subject to any disclaimer, the term of this patent is extended or adjusted under 35 U.S.C. 154(b) by 402 days.

(21) Appl. No.: 17/391,541

(22) Filed: Aug. 2, 2021

(65) Prior Publication Data

US 2021/0367489 A1 Nov. 25, 2021

Related U.S. Application Data

(63) Continuation of application No. PCT/JP2020/003136, filed on Jan. 29, 2020.

(30) Foreign Application Priority Data

Mar. 28, 2019 (JP) ................................. 2019-064484

(51) Int. Cl.
*H02K 15/00* (2006.01)
*H02K 1/16* (2006.01)
*H02K 3/12* (2006.01)
*H02K 3/28* (2006.01)

(52) U.S. Cl.
CPC ........... *H02K 15/0081* (2013.01); *H02K 1/16* (2013.01); *H02K 3/12* (2013.01); *H02K 3/28* (2013.01)

(58) Field of Classification Search
CPC ........ H02K 15/0081; H02K 1/16; H02K 3/12; H02K 3/28
See application file for complete search history.

(56) References Cited

U.S. PATENT DOCUMENTS

| | | | |
|---|---|---|---|
| RE46,265 E | 1/2017 | Tanaka et al. | |
| 2009/0200888 A1 | 8/2009 | Tanaka et al. | |
| 2016/0020658 A1 | 1/2016 | Tamura | |
| 2017/0054340 A1* | 2/2017 | Tanaka | ...................... H02K 3/12 |
| 2018/0097416 A1* | 4/2018 | Dang | ....................... H02K 3/50 |

OTHER PUBLICATIONS

U.S. Appl. No. 17/391,465, filed Aug. 2, 2021 in the name of Mai Goto et al.
U.S. Appl. No. 17/391,584, filed Aug. 2, 2021 in the name of Masayoshi Yamamoto et al.

* cited by examiner

*Primary Examiner* — Tulsidas C Patel
*Assistant Examiner* — Mohammed Ahmed Qureshi
(74) *Attorney, Agent, or Firm* — Oliff PLC

(57) ABSTRACT

A rotary electric machine includes a rotor and a stator. The stator has a coil end. The coil end has a plurality of lead wires. The plurality of lead wires have an inner lead wire with respect to the radial direction RD and an outer lead wire outside the inner lead wire with respect to the radial direction RD. The rotary electric machine includes a plurality of connection members. The inner lead wire and the outer lead wire are electrically and mechanically connected to the plurality of connection members. The plurality of connection members provide a heat transfer path from the inner lead wire. The inner lead wire and the outer lead wire demonstrate different vibration characteristics.

8 Claims, 16 Drawing Sheets

ROTARY ELECTRIC MACHINE, STATOR THEREOF AND MANUFACTURING METHOD THEREOF

CROSS REFERENCE TO RELATED APPLICATION

The present application is a continuation application of International Patent Application No. PCT/JP2020/003136 filed on Jan. 29, 2020, which designated the U.S. is based on and claims the benefit of priority from Japanese Patent Application No. 2019-64484 filed in Japan filed on Mar. 28, 2019, the entire disclosure of the above application is incorporated herein by reference.

TECHNICAL FIELD

The disclosure in this specification relates to a rotary electric machine, a stator thereof, and a manufacturing method thereof.

BACKGROUND

A rotary electric machine has a heat releasing structure due to create heat. In other view point, the rotary electric machine creates vibration, or is used in a vibration environment. In the above aspects, or in other aspects not mentioned, there is a need for further improvements in a rotary electric machine.

SUMMARY

A stator of a rotary electric machine disclosed herein, comprising: a stator core; and a stator coil mounted on the stator core and having a coil end protruding from an end of the stator core; and a connection member electrically and mechanically connected to a lead wire which extends out from the coil end, wherein the lead wire includes: an inner lead wire which extends out from a predetermined position with respect to the radial direction at the coil end and has M bent portions; and an outer lead wire which extends out from a position on an outside with respect to the radial direction than the inner lead wire at the coil end and has N bent portions more than M.

According to the stator of the rotary electric machine disclosed, the connection member is stably supported by the inner lead wire and the outer lead wire. Moreover, the inner lead wire has M bent portions and the outer lead wire has N bent portions. Therefore, the inner lead wire and the outer lead wire demonstrate different vibration characteristics. As a result, a resonance between the inner lead wire and the outer lead wire is suppressed.

The rotary electric machine disclosed herein includes the above mentioned stator of the rotary electric machine and a housing which accommodates the stator.

A manufacturing method of a stator of a rotary electric machine disclosed herein, comprising: a mounting step of mounting the stator coil to the stator core so as to form a coil end protruding from an end portion of the stator core; and an inner leading step of leading out an inner lead wire by bending M times from a predetermined position in the radial direction at the coil end; an outer leading step of leading out an outer lead wire from a position outside the inner lead wire in the radial direction at the coil end by bending the outer lead wire N times more than M, wherein a connecting step of connecting the inner lead wire and the outer lead wire to a connecting conductor.

According to the disclosed method of manufacturing a stator of a rotating electric machine, the inner lead wire and the outer lead wire are bent a different number of times. Due to the number of times of this bending process, the inner lead wire and the outer lead wire demonstrate different vibration characteristics. As a result, a resonance between the inner lead wire and the outer lead wire is suppressed.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

BRIEF DESCRIPTION OF DRAWINGS

The disclosure is further described with reference to the accompanying drawings in which.

DESCRIPTION OF EMBODIMENT

Figure 1:
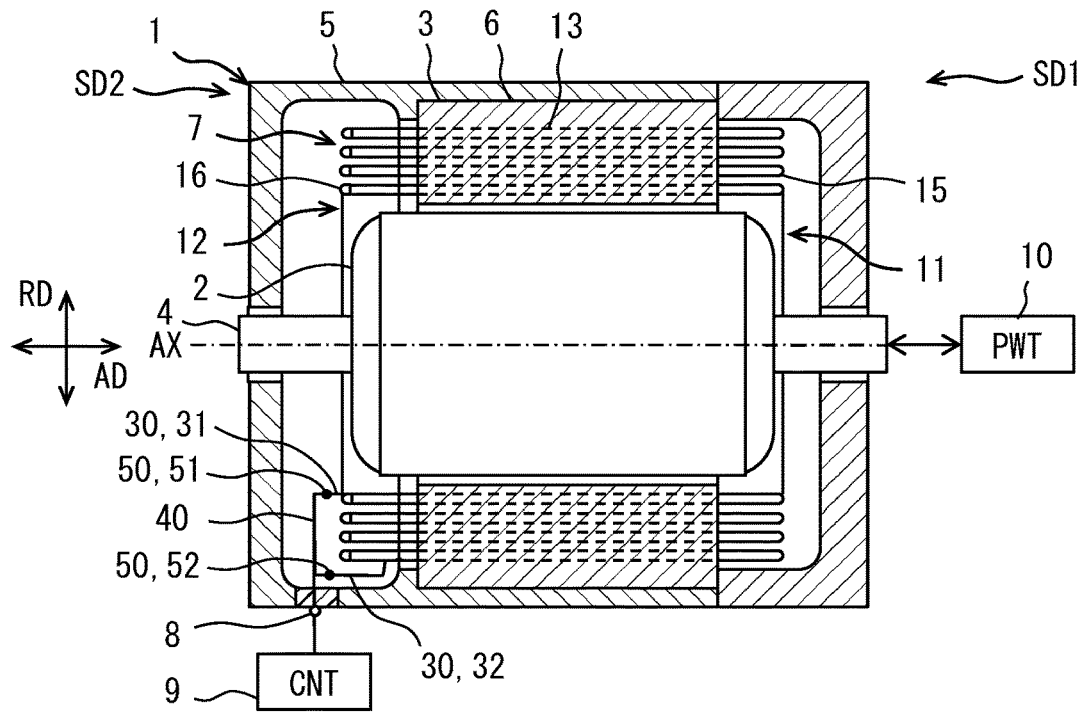
FIG. 1 is a cross-sectional view of a rotary electric machine of a first embodiment.

JP6237518B discloses a stator of a rotary electric machine having a plurality of segments accommodated in slots. The contents of JP6237518B are incorporated by reference as explanation of technical elements in this specification. In one view point, a stator of a rotary electric machine is required to have a structure which can withstand strong vibration. In other view point, a stator of a rotary electric machine is required to be improved to promote heat release. In the above aspects, or in other aspects not mentioned, there is a need for further improvements in a rotary electric machine and a stator thereof. It is an object disclosed to provide a rotary electric machine, a rotor thereof, and a method for manufacturing thereof, which can withstand strong vibrations.

Several embodiments will be described with reference to the drawings. In some embodiments, parts which are functionally and/or structurally corresponding and/or associated are given the same reference numerals, or reference numerals with different hundreds digit or higher digits. For corresponding parts and/or associated parts, reference can be made to the description of other embodiments.

First Embodiment

In FIG. 1, a rotary electric machine 1 is a motor generator. The rotary electric machine 1 is operatively coupled to a power system 10 (PWT) of an apparatus. The rotary electric machine 1 can function as a generator which generates electric power using power supplied from the power system 10. The rotary electric machine 1 can function as an electric motor which supplies power to the power system 10. The rotary electric machine 1 may be a generator or an electric motor. The power system 10 may include an internal combustion engine. The power system 10 provides a main power for the apparatus. In this specification, the apparatus may include a vehicle, an air conditioner, a pumping device, or the like. Furthermore, the term vehicle includes a car, a ship, an aircraft, a simulation device, and an amusement device.

The rotary electric machine 1 has a rotor 2 and a stator 3. The rotor 2 has a shaft 4. The shaft 4 defines a rotational axis AX. The rotor 2 is rotatable. The stator 3 is a cylindrical member. The rotor 2 and the stator 3 are accommodated in a housing 5. The housing 5 defines a substantially closed chamber which accommodates the rotor 2 and the stator 3. The closed chamber may accommodates a thermal medium (gas or liquid) for temperature control. The housing 5 fixes the stator 3 and supports the rotor 2 in a rotatable manner. The housing 5 may provide components of the power system 10. For example, the housing 5 may provide a part of a crankcase or a part of a transmission case.

The rotor 2 is magnetically coupled with the stator 3. The rotor 2 is supported by a shaft 4 so as to be rotatable with respect to the housing 5. The shaft 4 is connected to the power system 10. The rotor 2 is disposed in a radial direction inside of the stator 3. The rotor 2 has a plurality of magnetic poles arranged along the circumferential direction. The plurality of magnetic poles are formed by a plurality of permanent magnets embedded in the rotor 2. The rotor 2 can be provided by various structures.

The stator 3 has a stator core 6. The stator core 6 is a cylindrical shape. The stator core 6 is an annular shape. The stator core 6 has a plurality of steel plates laminated along the axial direction. The stator core 6 has a plurality of slots arranged in the circumferential direction. The plurality of slots are arranged at an equal pitch with respect to the circumferential direction. The plurality of slots may be arranged at several different pitches. The plurality of slots extend in the axial direction so as to penetrate the plurality of steel plates. Further, the plurality of slots extend in the radial direction. A typical stator core 6 has an annular back core. The stator core 6 has a plurality of teeth extending out in the radial direction inside from the back core. The plurality of teeth form a plurality of slots between them.

The stator 3 has a stator coil 7. The stator coil 7 is attached to the stator core 6. The rotary electric machine 1 has a power terminal 8. The rotary electric machine 1 has a plurality of power terminals 8. The power terminal 8 is connected to a power line located outside the housing 5. The power terminal 8 may be exposed to an outside of the housing 5. The power terminal 8 may be positioned in a terminal box and may be connected to the power line in the terminal box. The power terminal 8 may be positioned in the housing 5 and may be connected to the power line in the housing 5. In either configuration, a direct thermal path is provided through the housing 5 via the power terminal 8. The power terminal 8 is a terminal for electrically connecting the rotary electric machine 1 and a control device (CNT) 9. The power terminal 8 is used as an output terminal which may output electric power, and as an input terminal which may receive electric power. The power terminal 8 may also be called an external connection terminal of the rotary electric machine 1.

The rotary electric machine 1 is electrically connected to the control device 9. The control device 9 includes an inverter circuit. When the rotary electric machine 1 functions as a generator, it is driven by the power system 10 and outputs electric power. The control device 9 functions as a rectifier circuit which rectifies the electric power output from the rotary electric machine 1 when the rotary electric machine 1 is used as a generator. When the rotary electric machine 1 functions as an electric motor, it supplies power to the power system 10. The control device 9 supplies poly-phase AC power to the rotary electric machine 1 when the rotary electric machine 1 is used as an electric motor. In this embodiment, the poly-phase AC power is three-phase power.

The control device 9 is an electronic control unit. The control device 9 provides a control system. The control system has at least one arithmetic processing unit (CPU) and at least one memory device (MMR) as a storage medium for storing programs and data. The control system is provided by a microcomputer comprising a computer readable storage medium. The storage medium is a non-transitory tangible storage medium which non-transitory stores a computer readable program. The storage medium may be provided as a semiconductor memory, a magnetic disk, or the like. The control system may be provided by one computer or a group of computer resources linked via a data communication device. Means and/or functions provided by the control system can be provided by software recorded in a substantive memory device and a computer that can execute the software, software only, hardware only, or some combination of them. For example, the control system can be provided by a logic called if-then-else type, or a neural network tuned by machine learning. Alternatively, for example, if the control system is provided by an electronic circuit that is hardware, the control system may be provided by a digital circuit or an analog circuit that includes a large number of logic circuits.

The stator coil 7 has coil ends 11 and 12 and in-slot conductors 13. The coil ends 11 and 12 and the in-slot conductors 13 are provided by a plurality of segment conductors. The coil end 11 is also referred to as a first coil end. The coil end 12 is also referred to as a second coil end. The coil ends 11 and 12 are positioned at ends of the stator core 6. The coil ends 11 and 12 protrude from the stator core 6 in the axial direction. The coil ends 11 and 12 are bundles of a plurality of segment conductors included in the stator coil 7. In the coil ends 11 and 12, one segment conductor connects the in-slot conductor 13 positioned in one slot and the in-slot conductor 13 positioned in another different slot. The coil ends 11 and 12 may be provided by continuous turn portions 15 of the segment conductor. The coil ends 11 and 12 may be provided by joint portions 16 which joins different segment conductors.

The rotary electric machine 1 has one end SD1 and the other end SD2 on an opposite side of the one end SD1. The coil end 11 in a one end SD1 is formed by arranging only the turn portions 15 of the segment conductors. The coil end 12 at the other end SD2 includes a plurality of joint portions 16. The joint portion 16 is formed by joining an end portion of one segment conductor and another end portion of another segment conductor. The plurality of joint portion 16 may be provided by various joining methods. As a joining method, for example, TIG welding, Laser welding, electric resistance welding, solder joining, or the like can be used. The coil end 12 is formed by arranging only a plurality of joint portions 16. All of the plurality of joint portions 16 for forming the stator coil 7 are arranged at the coil end 12. Therefore, the stator coil 7 connects a plurality of in-slot conductor 13 by a plurality of turn portions 15 at the coil end 11 on the one end SD1. Therefore, the stator coil 7 connects a plurality of in-slot conductors 13 by the plurality of joint portions 16 at the coil end 12 on the other end SD2.

The in-slot conductor 13 extends straight along the axial direction AD. The conductor 13 in the slot is accommodated in the slot. In this embodiment, eight in-slot conductors 13 are accommodated in one slot.

The stator coil 7 is electrically connected so as to form a poly-phase connection. The stator coil 7 is connected to provide star or delta connection. In this embodiment, the stator coil 7 provides a star connection.

The stator coil 7 has a lead wire 30 extending from the coil end 12. The stator coil 7 includes a plurality of lead wires 30. The lead wires 30 are arranged on the coil end 12. The lead wires 30 provide both ends of a plurality of coils as a poly-phase winding. In this embodiment, since a three-phase winding is provided, at least six lead wires 30 are provided. Further, in this embodiment, one phase is provided by a parallel connection of "n" coils. Therefore, the stator coil 7 has 6×n pieces of the lead wires 30. In this embodiment, one phase is provided by a parallel connection of four coils. Therefore, the stator coil 7 includes 24 pieces of the lead wires 30.

The plurality of lead wires 30 include a plurality of inner lead wires 31 and a plurality of outer lead wires 32 which are separated from each other in the radial direction RD at the coil end 12. The inner lead wire 31 extends out from a predetermined position with respect to the radial direction at the annular shaped coil end 12. The inner lead wire 31 has M bends. The outer lead wire 32 extends out from a position on an outer side with respect to the radial direction RD than the inner lead wire 31 at the coil end 12. The outer lead wire 32 has N bends which is more than M.

In the illustrated example, the inner lead wire 31 is positioned on a layer of the most inside (the innermost layer) of the coil end 12. The inner lead wire 31 is classified into two inner lead wires with respect to a height in the axial direction AD. The outer lead wire 32 is positioned on a layer of the most outside (the outermost layer) of the coil end 12. The outer lead wire 32 is classified into two outer lead wires with respect to a height in the axial direction AD and the position of the radial direction RD.

The rotary electric machine 1 has a plurality of connection members 40. The connection member 40 provides a part of the stator coil 7 without being housed in the slot. The connection member 40 is also called a bus bar. The connection member 40 is connected to the lead wire 30. The connection member 40 is a plate-shaped member positioned to face an end surface of the coil end 12 in the axial direction AD. The connection member 40 is thermally coupled to an outwardly extending power terminal 8. The connection member 40 is electrically and mechanically connected to the inner lead wire 31 and the outer lead wire 32. The connection member 40 includes a member which provides a neutral point connection by being connected to a plurality of lead wires 30. The connection member 40 includes a member which provides a power end by being connected to a plurality of lead wires 30. The member, which provides the power end, provides the power terminal 8.

The rotary electric machine 1 includes a joint portion 50. The joint portion 50 electrically and mechanically joins the lead wire 30 and the connection member 40. The plurality of joint portions 16 may be provided by various joining methods. As a joining method, for example, TIG welding, Laser welding, electric resistance welding, solder joining, or the like can be used. The joint portion 50 includes an inner joint portion 51 which joins the inner lead wire 31 and the connection member 40. The joint portion 50 includes an outer joint portion 52 which joins the outer lead wire 32 and the connection member 40.

Figure 2:
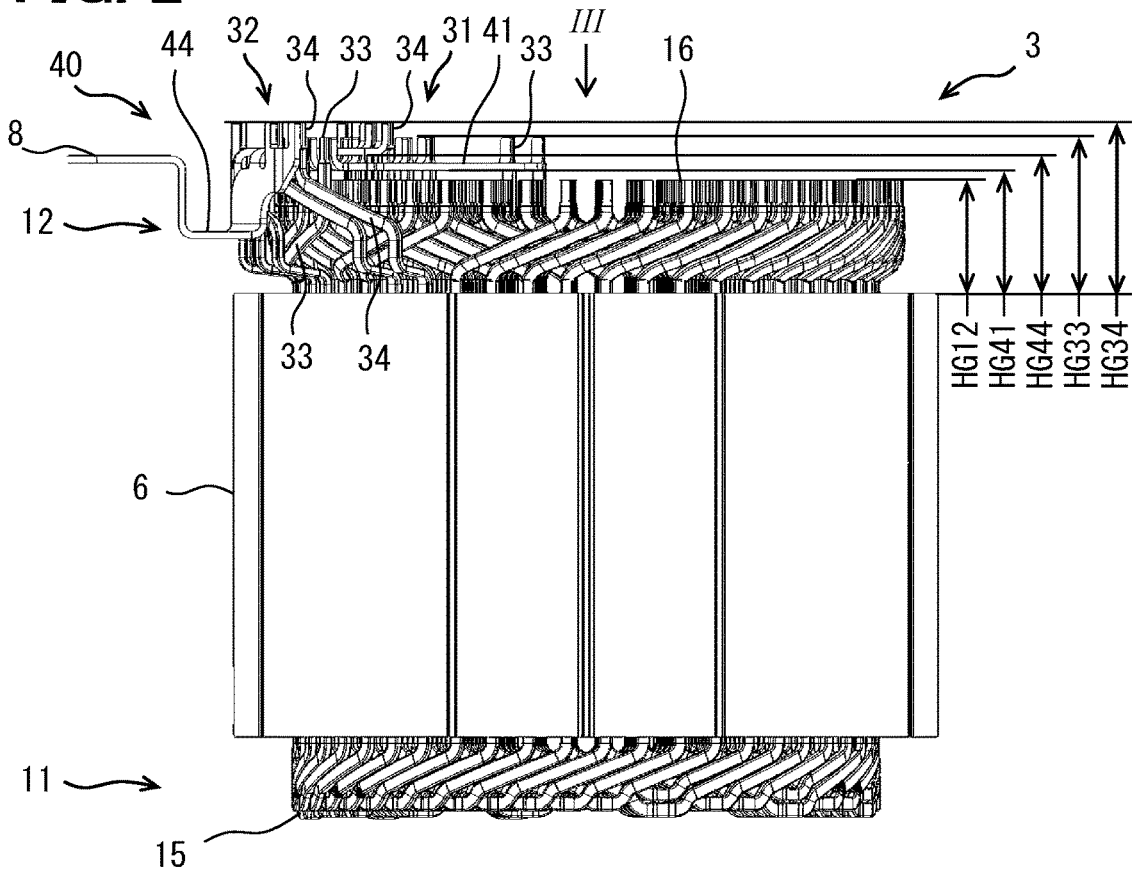
FIG. 2 is a side view showing a stator of a rotary electric machine.

In FIG. 2, a state before welding the joint portion 16 is illustrated. When the joint portion 16 is welded and the conductor melts, the joint portion 16 may have a melted mark. The coil end 12 includes a plurality of conductors protruding from the stator core 6 by a height of HG12. The height HG12 may be defined by the melted mark.

The lead wire 30 includes a plurality of low lead wires 33 protruding from the stator core 6 by a height HG33. The lead wire 30 includes a plurality of high lead wires 34 protruding from the stator core 6 by a height HG34. The height HG33 is lower than the height HG34 (HG33<HG35). The inner lead wire 31 includes a low lead wire 33 and a high lead wire 34. The outer lead wire 32 includes a low lead wire 33 and a high lead wire 34.

The connection member 40 has a first connection member 41 which provides a neutral point. The first connection member 41 is electrically and mechanically joined to the plurality of low lead wires 33. The connection member 40 has a second connection member 44 which provides the power terminal 8. The connection member 40 has a plurality of second connection members 42, 43 and 44. In the drawing, only the second connection member 44 is illustrated. The second connection members 42, 43 and 44 are electrically and mechanically joined to the plurality of high lead wires 34. The first connection member 41 is disposed to be separated away from the stator core 6 by a height HG41. The second connection members 42, 43 and 44 are disposed to be separated away from the stator core 6 by a height of HG44. The height HG41 is lower than the height HG44 (HG41<HG44).

Figure 3:
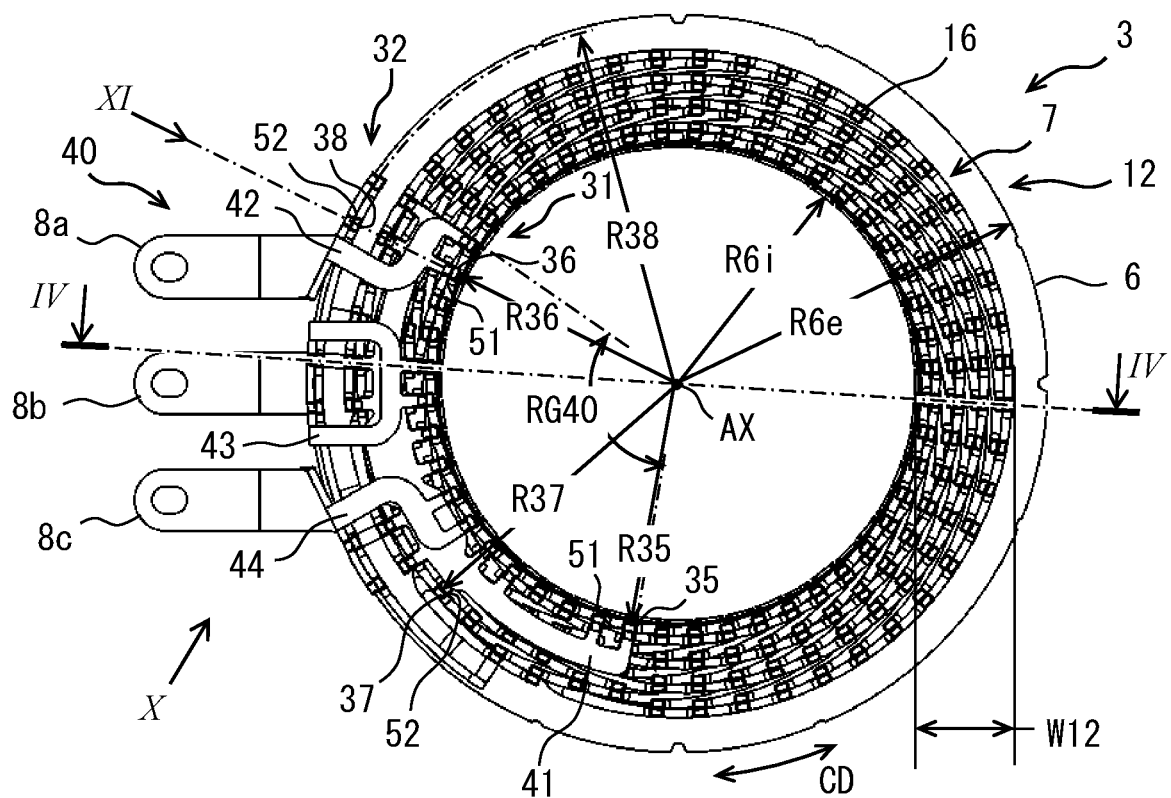
FIG. 3 is a plan view showing the stator.

FIG. 3 shows a plan view in an arrow III in FIG. 2. The stator core 6 has an outer surface having a radius R6e. The stator core 6 has an inner surface having a radius R6i. The plurality of connection members 40 are arranged in an arc range RG40 in the circumferential direction CD. The arc range RG40 is set to be equal to a half circumference of the stator core 6 or smaller than the half circumference. As a result, vibration of the connection member 40 is suppressed.

The coil end 12 is formed by a plurality of segment conductors and a plurality of joint portions 16. The plurality of segment conductors and the plurality of joint portions 16 are arranged so as to form a plurality of layers in the radial direction RD of the coil end 12. In the illustrated example, the plurality of segment conductors form eight layers. The plurality of joint portions 16 form four layers along the radial direction RD.

The first connection member 41 is arranged to be stacked on the end surface of the coil end 12 in the axial direction AD. In other words, the first connection member 41 is arranged so as to face the plurality of joint portions 16. The first connection member 41 is arranged in an arc shape along the coil end 12. The first connection member 41 is positioned within the annular basic width W12 in the radial direction RD of the coil end 12. The annular basic width W12 is positioned on a radial direction outer side than the radius R6$i$. The annular basic width W12 is positioned on a radial direction inner side than the radius R6$e$. The basic width W12 is a width required to join a plurality of segment conductors providing the stator coil 7 at the coil end 12.

The second connection member is a plurality of second connection members 42, 43 and 44 corresponding to a plurality of phase windings. The plurality of second connection members 42, 43 and 44 provide three power terminals 8$a$, 8$b$ and 8$c$ for three-phase power. Each of the second connection members 42, 43 and 44 is arranged in a separated and dispersed manner each other with respect to the circumferential direction CD. Each of the plurality of second connection members 42, 43 and 44 extends out in the radial direction outside of the stator 3 from the annular basic width W12.

The first connection member 41 and the second connection member 42, 43 and 44 are arranged to face each other in the axial direction AD so as to be thermally coupled to each other. The plurality of second connection members 42, 43 and 44 are arranged in a stacking manner so as to overlap the first connection member 41 with respect to the axial direction AD. The first connection member 41 and the plurality of second connection members 42, 43 and 44 are arranged so that the main planes provided by them spread out in parallel with each other. The first connection member 41 is a plate-shaped member. The first connection member 41 provides a main plane extending parallel to the annular end surface of the coil end 12. Each of the plurality of second connection members 42, 43 and 44 has a plate-shaped portion at least in part. Each of the plurality of second connection members 42, 43 and 44 has a plate-like portion extending parallel to the main plane. The stacked arrangement of the first connection member 41 and the plurality of second connection members 42, 43 and 44 provides thermal coupling. Therefore, heat transfer between the first connection member 41 and the plurality of second connection members 42, 43 and 44 is provided. The heat transfer includes, for example, heat transfer from the first connection member 41 to the plurality of second connection members 42, 43 and 44. The plurality of second connection members 42, 43 and 44 provide heat transfer toward the radial direction outside from the stator 3.

The plurality of inner lead wires 31 have a plurality of first lead wires 35, which are low lead wires 33. The plurality of first lead wires 35 are electrically and mechanically connected to the first connection member 41. In the illustrated example, the stator coil 7 includes six first lead wires 35. All the first lead wires 35 are connected to the first connection member 41. The first lead wire 35 is positioned on the layer of the most inside of the annular basic width W12. The first lead wire 35 is positioned at a radius R35. The radius R35 is larger than the radius R6$i$ (R6$i$<R35).

The plurality of inner lead wires 31 have a plurality of second lead wires 36, which are high lead wires 34. The second lead wire 36 is electrically and mechanically connected to the second connection members 42, 43 and 44. In the illustrated example, the stator coil 7 includes six second lead wires 36. Two second lead wires 36 are connected to the second connection member 42. Two second lead wires 36 are connected to the second connection member 43. Two second lead wires 36 are connected to the second connection member 44. The second lead wire 36 is positioned on the layer of the most inside of the annular basic width W12. The second lead wire 36 is positioned at a radius R36. The radius R36 is equal to the radius R35 (R35=R36).

The second lead wire 36, which is both the inner lead wire 31 and the high lead wire 34, is arranged over from the stator core 6 to a predetermined height HG34 through a first path having a predetermined length. The first path is slightly longer than the path taken by the segment conductors connected by the joint portion 16. A length of the first path is the shortest among the plurality of lead wires 30.

The plurality of outer lead wires 32 have a plurality of third lead wires 37, which are low lead wires 33. The plurality of third lead wires 37 are electrically and mechanically connected to the first connection member 41. In the illustrated example, the stator coil 7 includes six third lead wires 37. All the third lead wires 37 are connected to the first connection member 41. The third lead wire 37 is positioned on the layer of the most outside of the annular basic width W12. The third lead wire 37 is positioned at a radius R37. The radius R37 is smaller than the radius R35 (R35<R37).

The plurality of outer lead wires 32 have a plurality of fourth lead wires 38, which are high lead wires 34. The fourth lead wire 38 is electrically and mechanically connected to the second connection members 42, 43 and 44. In the illustrated example, the stator coil 7 includes six fourth lead wires 38. Two fourth lead wires 38 are connected to the second connection member 42. Two fourth lead wires 38 are connected to the second connection member 43. Two fourth lead wires 38 are connected to the second connection member 44. The fourth lead wire 38 is positioned further outside than the annular basic width W12. The fourth lead wire 38 is positioned at a radius R38. The radius R38 is larger than the radius R37 (R37<R38). The radius R38 is smaller than the radius R6$e$ (R38<R6$e$).

The fourth lead wire 38, which is both the outer lead wire 32 and the high lead wire 34, is arranged over from the stator core 6 to a predetermined height HG34 through a second path having a predetermined length. The second path is longer than the path taken by the segment conductors connected by the joint portion 16. A length of the second path is the longest among the plurality of lead wires 30.

The fourth lead wire 38 is positioned on the most outside in the radial direction among the plurality of lead wires 30. Moreover, the fourth lead wire 38 is positioned outer side than the annular basic width W12. The fourth lead wire 38 has a bent portion for extending further outside than the annular basic width W12. The fourth lead wire 38 is the longest among the plurality of lead wires 30. The annular basic width W12 is a width which is required to form the plurality of joint portions 16 at the coil end 12. Therefore, the fourth lead wire 38 is a special lead wire formed by executing an additional manufacturing method to the manufacturing method for forming the coil end 12. From this view point, the fourth lead wire 38 is also called a special lead wire extending out outer side than the coil end 12.

The first connection member 41 is connected to six first lead wires 35 and six third lead wires 37. The first connection member 41 is connected to six inner lead wires 31 and six outer lead wires 32. The first connection member 41 is supported by a plurality of lead wires 30 which are separated from each other in the radial direction RD. In other words, the first connection member 41 is supported by the lead wire 30 on the innermost layer of the coil end 12 and the lead wire 30 on the outermost layer.

Each of the second connection members 42, 43 and 44 is connected to two second lead wires 36 and two fourth lead wires 38. Each of the second connection members 42, 43 and 44 is connected to two inner lead wires 31 and two outer lead wires 32. Each of the second connection members 42, 43 and 44 is supported by a plurality of lead wires 30 separated in the radial direction RD. In other words, each of the second connection members 42, 43 and 44 is supported by the lead wire 30 on the innermost layer of the coil end 12 and the lead wire 30 on the outermost layer. Moreover, each of the second connection members 42, 43 and 44 is supported by the lead wire 30 on the innermost layer of the coil end 12 and a special lead wire 30 positioned further outside than the annular basic width W12.

The outer lead wire 32 is arranged on the radial direction outside of the inner lead wire 31 to be connected to each of the second connection members 42, 43 and 44. In other words, the inner lead wire 31 and the outer lead wire 32 to be connected to each of the second connection members 42, 43 and 44 are arranged on the same diameter line of the stator core 6. The second lead wire 36 and the fourth lead wire 38 are arranged on the same diameter line. Therefore, the second lead wire 36 and the fourth lead wire 38 connected to one of the second connection members 42, 43 and 44 are arranged at the same angular position of the circumferential direction CD on the coil end 12.

The plurality of second lead wires 36 are arranged adjacent to each other in the circumferential direction CD. The plurality of fourth lead wires 38 are arranged adjacent to each other in the circumferential direction CD. As a result, the second lead 36 and the fourth lead wire 38 are compactly arranged. The second connection members 42, 43 and 44 can be efficiently connected to the plurality of lead wires 30 without extending long along the circumferential direction CD.

The second lead wire 36 and the fourth lead wire 38 connected to one of the second connection members 42, 43 and 44 are lead wires having the same phase winding. For example, the two second lead wires 36 and the two fourth lead wires 38 connected to the second connection member 42 are four lead wires for four phase windings connected in parallel as any one of phase windings of U, V, and W.

Figure 4:
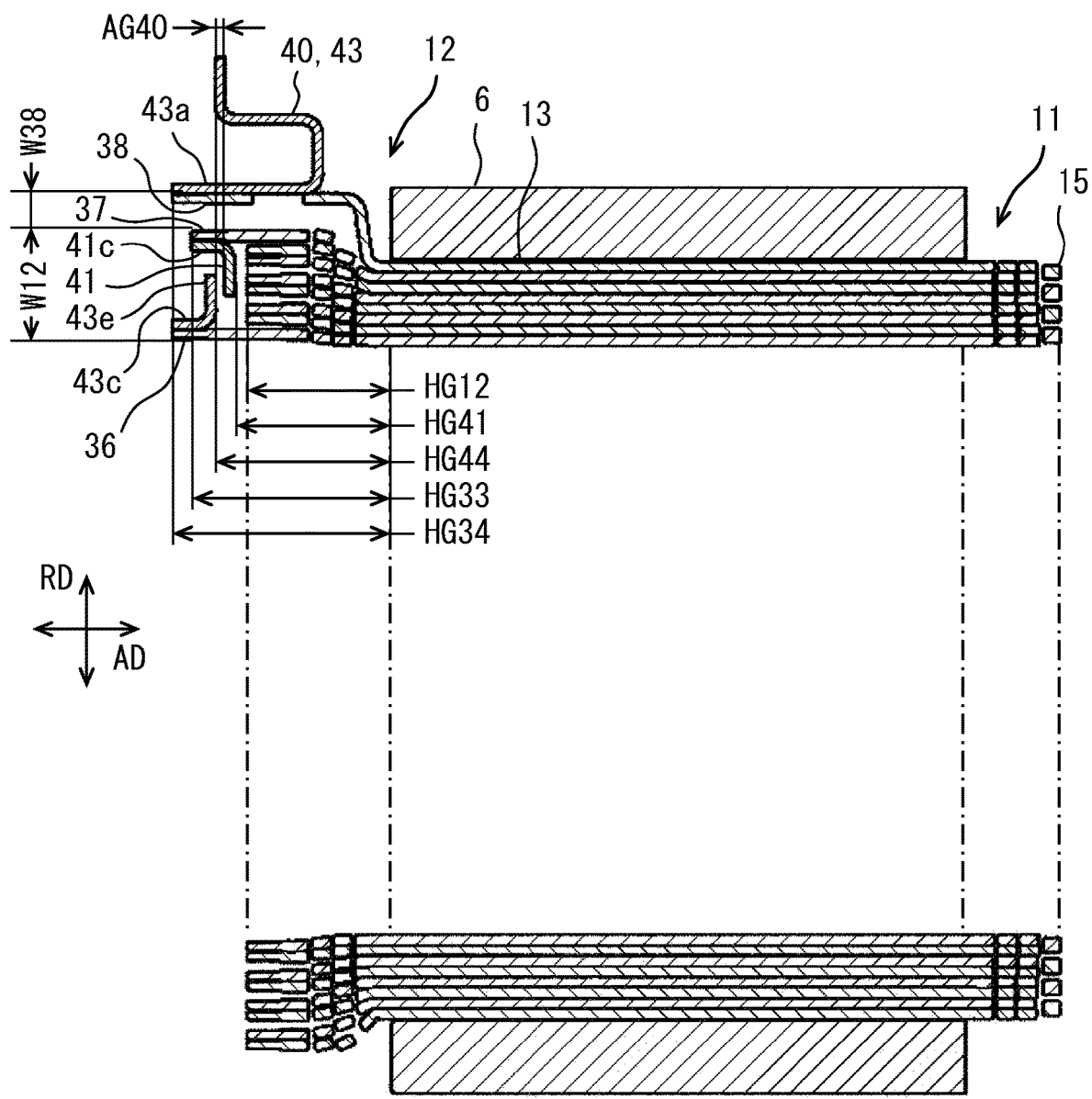
FIG. 4 is a cross-sectional view showing the stator.

FIG. 4 shows a cross section on a line IV-IV in FIG. 3. The annular basic width W12 is greater than the slot depth in the radial direction RD. The fourth lead wire 38 extends out in the radial direction outside by a width W38 more than the annular basic width W12. The width W38 is larger than the gap AG40 between the first connection member 41 and the second connection members 42, 43 and 44. Conversely, the gap AG40 is smaller than the width W38 and provides a path that facilitates heat transfer.

Figure 5:
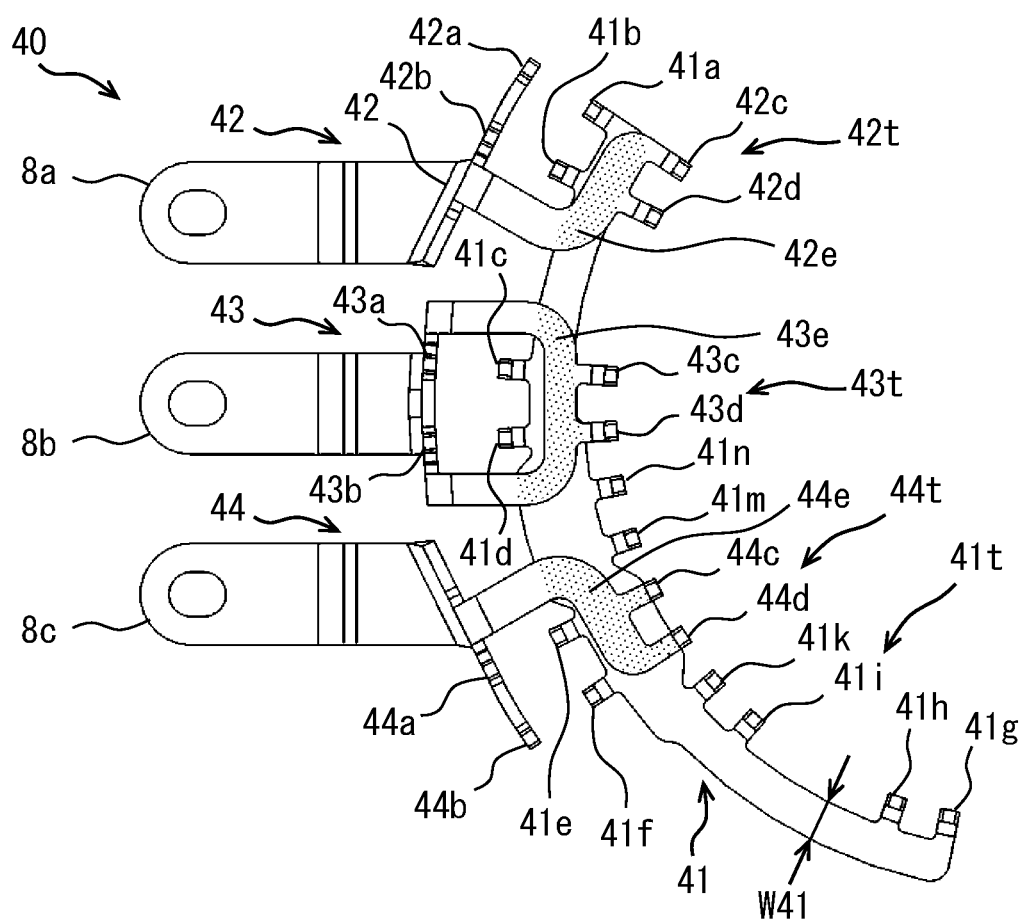
FIG. 5 is a plan view showing connection members.

FIG. 5 is a plan view of the connection member 40. Each of the plurality of connection members 40 is formed by forming a plate material of a conductor metal into a predetermined shape and further bending it into the shape illustrated. Therefore, the connection member 40 basically has a shape as a plate-shaped member. The connection member 40 has a plurality of bent portions.

The first connection member 41 includes a plurality of terminals 41t. The plurality of terminals 41t include a plurality of terminals 41a, 41b, 41c, 41d, 41e, 41f connected to the third lead wire 37. The plurality of terminals 41t include a plurality of terminals 41g, 41h, 41i, 41k, 41m, 41n connected to the first lead wire 35. The second connection member 42 includes a plurality of terminals 42t. The plurality of terminals 42t include a plurality of terminals 42c and 42d connected to the second lead wire 36. The plurality of terminals 42t include a plurality of terminals 42a and 42b connected to the fourth lead wire 38. The second connection member 43 includes a plurality of terminals 43t. The plurality of terminals 43t include a plurality of terminals 43c and 43d connected to the second lead wire 36. The plurality of terminals 43t include a plurality of terminals 43a and 43b connected to the fourth lead wire 38. The second connection member 44 includes a plurality of terminals 44t. The plurality of terminals 44t include a plurality of terminals 44c and 44d connected to the second lead wire 36. The plurality of terminals 44t include a plurality of terminals 44a and 44b connected to the fourth lead wire 38.

The first connection member 41 extends in an arc shape. The first connection member 41 has a width W41 in the radial direction RD. The width of the first connection member 41 is partially wider than the width W41. The width W41 is larger than the width of the segment conductor forming the stator coil 7. The first connection member 41 extends in a plane. The first connection member 41 and the plurality of second connection members 42, 43 and 44 face each other in the axial direction AD. The plurality of second connection members 42, 43 and 44 have plate-shaped portions 42e, 43e and 44e which are arranged with the first connection member 41 in a stacking manner with respect to the axial direction.

The second connection member 42 has a plate-shaped portion 42e extending parallel to the first connection member 41. The plate-shaped portion 42e is indicated by a dot pattern. The plate-shaped portion 42e extends in an arc shape along the first connection member 41. The cross-sectional area of the plate-shaped portion 42e is larger than the total cross-sectional area of the terminals 42c and 42d electrically connected through the plate-shaped portion 42e. The cross section of the plate-shaped portion 42e in the radial direction is larger than the total cross section of the terminals 42c and 42d. The second connection member 42 is arranged along the coil end 12 from the power terminal 8a toward the plurality of terminals 42t. The second connection member 42 has a plate-shaped portion 42g extending along the radial direction outside of the coil end 12.

The power terminal 8a and the plate-shaped portion 42e are connected to each other by a connecting portion. The connecting portion is provided by the plate-shaped portion 42g. As a result, the transfer of heat from the inner lead wire 31 to the power terminal 8a through the plate-shaped portion 42e is promoted.

The second connection member 43 has a plate-shaped portion 43e extending parallel to the first connection member 41. The plate-shaped portion 43e is indicated by a dot pattern. The plate-shaped portion 43e extends in an arc shape along the first connection member 41. The cross-sectional area of the plate-shaped portion 43e is larger than the total cross-sectional area of the terminals 43c and 43d electrically connected through the plate-shaped portion 43e. The cross section of the plate-shaped portion 43e in the radial direction is larger than the total cross section of the terminals 43c and 43d. The second connection member 43 is arranged along the coil end 12 from the power terminal 8a toward the plurality of terminals 43t. The second connection member 43 has a plate-shaped portion 43g extending along the radial direction outside of the coil end 12.

The power terminal 8b and the plate-shaped portion 43e are connected to each other by two connecting portions provided at both ends of the plate-shaped portion 43e. The connecting portion is provided by the plate-shaped portion 43g. The two connecting portions facilitate heat conduction. As a result, the transfer of heat from the inner lead wire 31 to the power terminal 8b through the plate-shaped portion 43e is promoted.

The second connection member 44 has a plate-shaped portion 44e extending parallel to the first connection member 41. The plate-shaped portion 44e is indicated by a dot pattern. The plate-shaped portion 44e extends in an arc shape along the first connection member 41. The cross-sectional area of the plate-shaped portion 44e is larger than the total cross-sectional area of the terminals 44c and 44d electrically connected through the plate-shaped portion 44e. The cross section of the plate-shaped portion 44e in the radial direction is larger than the total cross section of the terminals 44c and 44d. The second connection member 44 is arranged along the coil end 12 from the power terminal 8a toward the plurality of terminals 44t. The second connection member 44 has a plate-shaped portion 44g extending along the radial direction outside of the coil end 12.

The power terminal 8c and the plate-shaped portion 44e are connected to each other by a connecting portion. The connecting portion is provided by the plate-shaped portion 44g. As a result, the transfer of heat from the inner lead wire 31 to the power terminal 8c through the plate-shaped portion 44e is promoted.

Further, indirect heat transfer from the first connection member 41 to the plate-shaped portions 42e, 43e and 44e occurs. Therefore, the heat transfer from the inner leader wire 31 to the power terminals 8a, 8b and 8c through the plate-shaped portions 42e, 43e and 44e is promoted.

Figure 6:
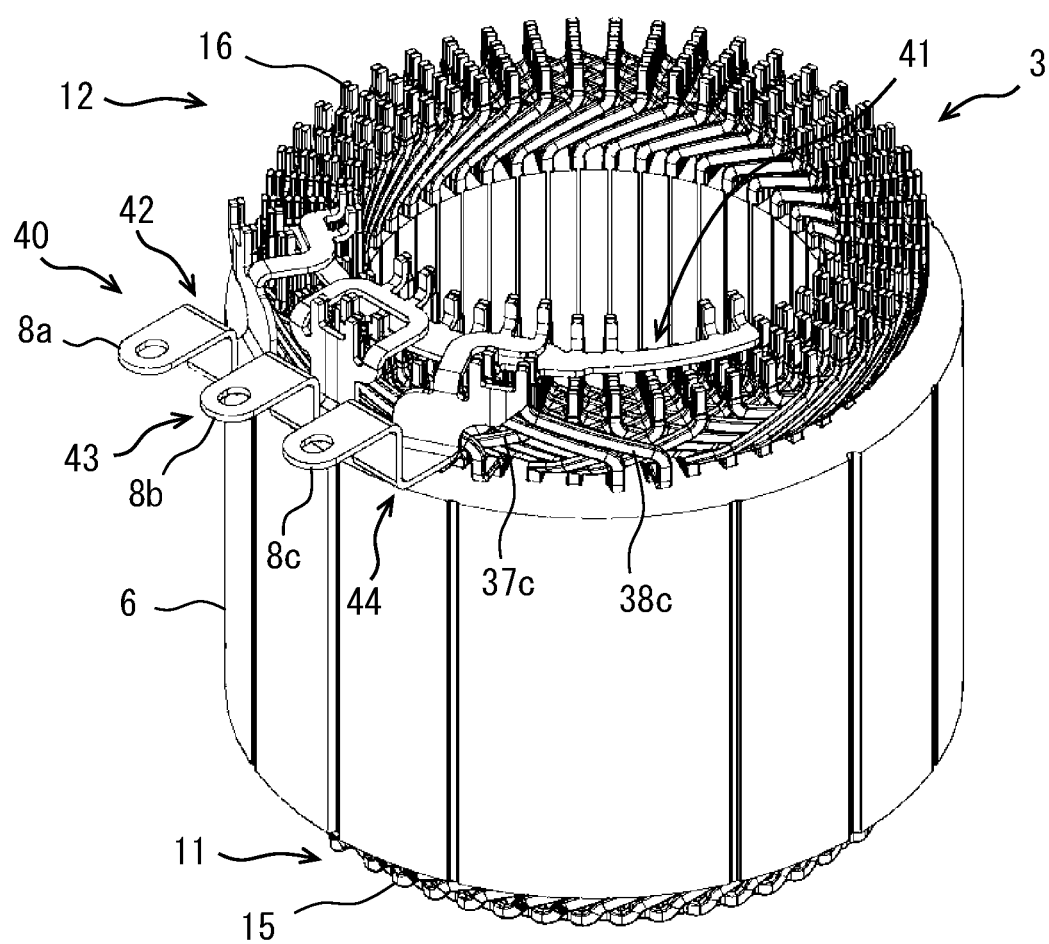
FIG. 6 is a perspective view showing the stator.

In FIG. 6, the third lead wire 37, which is the outer lead wire 32, has an oblique portion 37c. At the coil end 12, the oblique portion 37c is inclined in the circumferential direction CD while extending from the stator core 6 in the axial direction AD. The fourth lead wire 38, which is the outer lead wire 32, also has an oblique portion 38c. At the coil end 12, the oblique portion 38c is inclined in the circumferential direction CD while extending from the stator core 6 in the axial direction AD. The inclination direction of the oblique portion 37c and the inclination direction of the oblique portion 38c are opposite to each other. As a result, different vibration characteristics can be obtained in the third lead wire 37 and the fourth lead wire 38 included in the outer lead wire 32.

Figure 7:
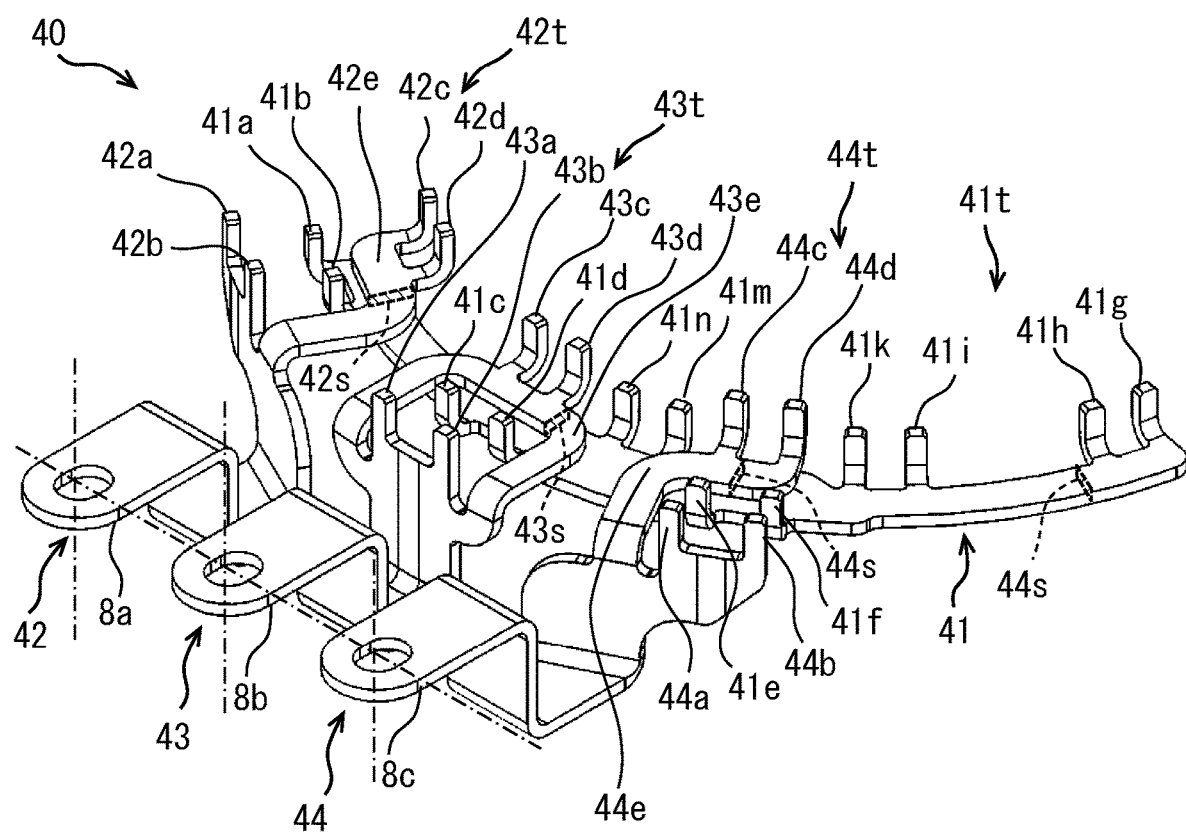
FIG. 7 is a perspective view showing the connection members.
Figure 8:
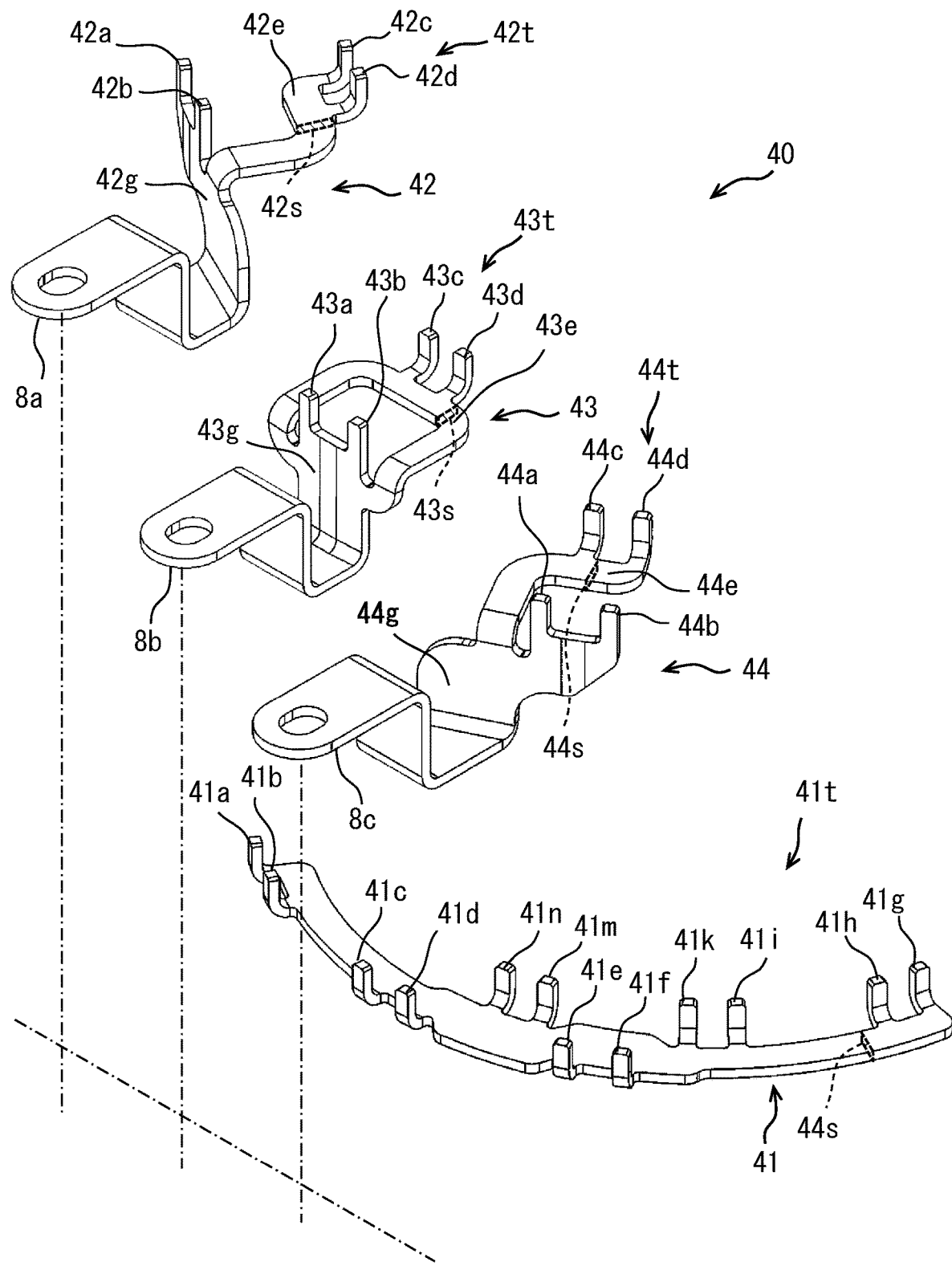
FIG. 8 is an exploded perspective view showing the connection members.

In FIGS. 7 and 8, the cross-sectional shape of the first connection member 41 is illustrated. The cross section 41s shows a cross section in a plane parallel to the axial direction AD and the radial direction RD. The cross section 41s is also a cross section perpendicular to the circumferential direction CD. The first connection member 41 also has a cross-sectional portion larger than the cross-section 41s. The cross section 41s defines the minimum cross-sectional area. As a result, the first connection member 41 provides a cross-sectional area larger than one terminal 41t with respect to the circumferential direction CD. The cross section 41s of the first connection member 41 is larger than the cross section perpendicular to the longitudinal direction of the segment conductor which provides the stator coil 7. The first connection member 41 provides a large thermal cross-sectional area along the circumferential direction CD.

In FIGS. 7 and 8, the cross-sectional shapes of the plate-shaped portions 42e, 43e, and 44e are illustrated. The cross sections 42s, 43s and 44s show cross sections in a plane parallel to the axial direction AD and the radial direction RD. The cross sections 42s, 43s and 44s are also cross sections perpendicular to the circumferential direction CD. The cross sections 42s, 43s and 44s are also cross sections perpendicular to the current direction in the plate-shaped portions 42e, 43e and 44e. The cross sections 42s, 43s and 44s of the second connection members 42, 43 and 44 are larger than the cross section perpendicular to the longitudinal direction of the segment conductor providing the stator coil 7. The cross sections 42s, 43s and 44s provide a large heat conduction cross section for heat from the second lead wire 36, which is the inner lead wire 31. Further, the cross sections 42s, 43s and 44s provide a large heat conduction cross section with respect to the heat indirectly transferred from the first connection member 41.

Figure 9:
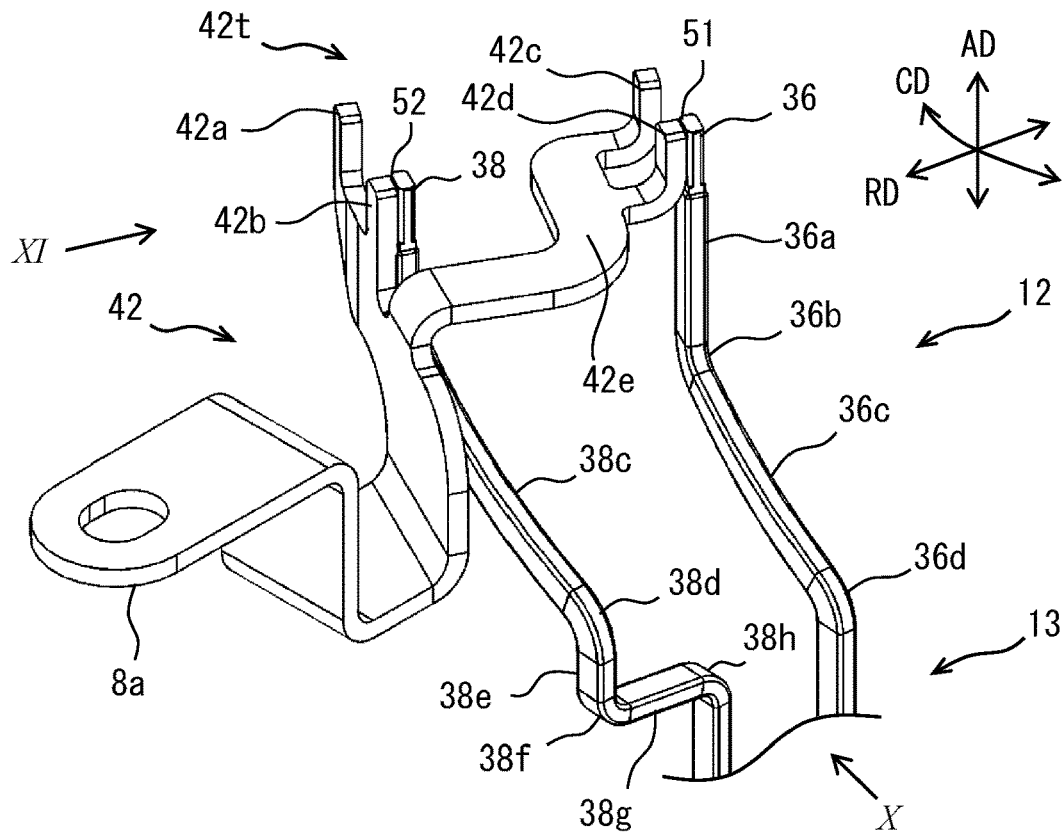
FIG. 9 is a perspective view showing lead wires and a connection member.
Figure 10:
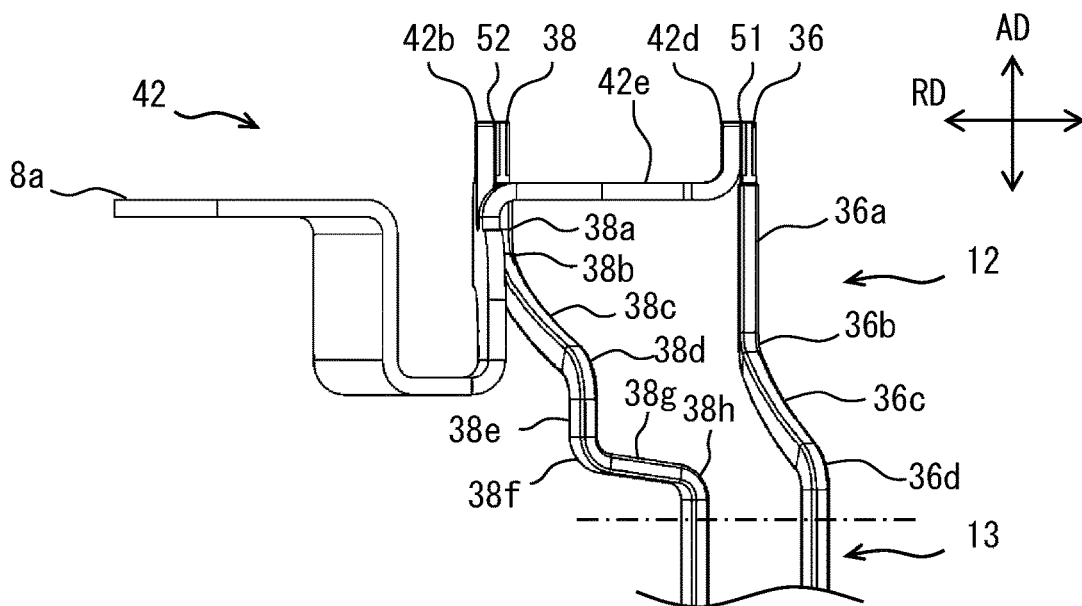
FIG. 10 is a side view showing the lead wires and the connection member.
Figure 11:
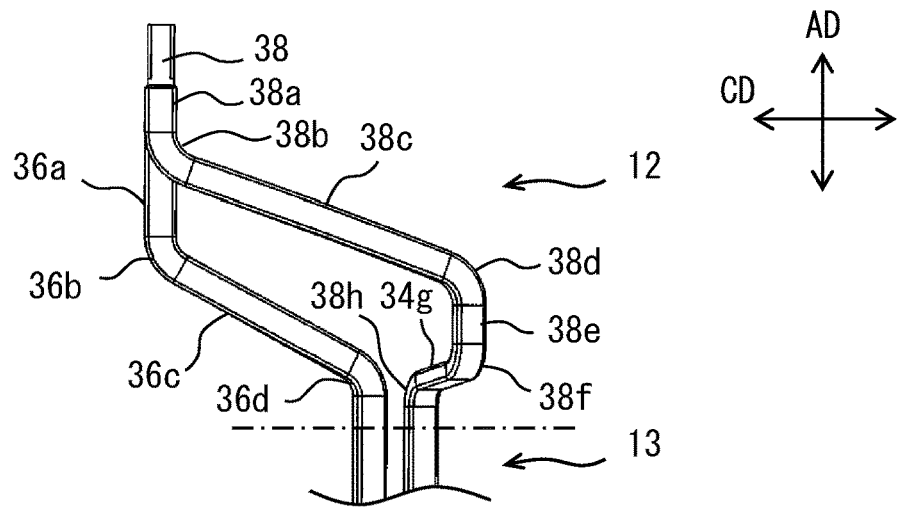
FIG. 11 is a side view showing the lead wires.

In FIGS. 9, 10, and 11, the second connection member 42, the second lead wire 36, and the fourth lead wire 38 are illustrated. FIG. 10 shows a side view taken along the arrow X of FIGS. 3 and 9. FIG. 11 shows a side view taken along the arrow XI of FIGS. 3 and 9.

The second lead wire 36 extends out from the in-slot conductor 13 in the slot. The second lead wire 36 has a distal end portion 36a and an oblique portion 36c. The distal end portion 36a extends straight toward the joint portion 16. The oblique portion 36c extends along the axial direction AD and also extends in the circumferential direction CD. There is a bent portion 36b between the distal end portion 36a and the oblique portion 36c. There is a bent portion 36d between the in-slot conductor 13 and the oblique portion 36c. The bent portions 36b and 36d are bent portions between the axial direction AD and the circumferential direction CD. As a result, the second lead wire 36 includes two bent portions 36b and 36d.

The fourth lead wire 38 extends out from the in-slot conductor 13 in the slot. The fourth lead wire 38 has a distal end portion 38a and an oblique portion 38c. Further, the fourth lead wire 38 has an intermediate straight portion 38e and a radial portion 38g. The distal end portion 38a extends straight toward the joint portion 16. The oblique portion 38c extends along the axial direction AD and also extends in the circumferential direction CD. The intermediate straight portion 38e extends in the axial direction AD. The radial portion 38g extends along the radial direction RD while intersecting the axial direction AD. There is a bent portion 38b between the distal end portion 38a and the oblique portion 38c. There is a bent portion 38d between the oblique portion 38c and the intermediate straight portion 38e. The bent portions 38b and 38d are bent portions between the axial direction AD and the circumferential direction CD. There is a bent portion 38f between the intermediate straight portion 38e and the radial portion 38g. Further, there is a bent portion 38h between the radial portion 38g and the in-slot conductor 13. The bent portions 38f and 38h are bent portions between the axial direction AD and the radial direction RD. As a result, the fourth lead wire 38 includes four bent portions 38b, 38d, 38f and 38h. Moreover, the fourth lead wire 38 includes two types of bent portions having different bending directions. One type of bent portions is a circumferential direction bent portion between the axial direction AD and the circumferential direction CD. The other type of bent portions is a radial direction bent portion between the axial direction AD and the radial direction RD.

The plurality of second lead wires 36 reach the second connection members 42, 43 and 44 through an inside of the coil end 12. A route through which the second lead wire 36 passes is called a first route. On the other hand, the plurality of fourth lead wires 38 reach the second connection members 42, 43 and 44 through the radial direction outside of the coil end 12. A route through which the fourth lead wire 38 passes is called a second route.

The second lead wire 36 and the fourth lead wire 38 demonstrate different vibration characteristics with respect to the vibration applied to the stator 3. The different vibration characteristics may be due to the number of bent portions. The different vibration characteristics may be due to the number of bending operations. The different vibration characteristics may be due to a difference in length between the first path and the second path. Further, the different vibration characteristics may be due to a distance from the central axis AX. One of the vibration characteristics is grasped as a resonance characteristic. The second lead wire 36 and the fourth lead wire 38 demonstrate different resonance characteristics with respect to the vibration frequency. A resonance frequency f2 of the second lead wire 36 is different from a resonance frequency f4 of the fourth lead wire 38. Since the fourth lead wire 38 is longer than the second lead wire 36, the resonance frequency f4 may be lower than the resonance frequency f2 (f4<f2). Since the number of bent portions 38b, 38d, 38f and 38h in the fourth lead wire 38 is greater than the number of bent portions 36b and 36d in the second lead wire 36, the resonance frequency f4 may be higher than the resonance frequency f2 (f4>f2). In either case, the resonance frequency f2 and the resonance frequency f4 have different numerical values (f2≠f4). As a result, it is possible to avoid a situation in which strong vibrations simultaneously act on both the inner joint portion 51 and the outer joint portion 52 of the second connection member 42.

The shapes of the second lead wire 36 and the fourth lead wire 38 illustrated in FIGS. 9, 10 and 11 are also provided in the second connection member 43 and the second connection member 44. As a result, also in the second connection member 43 and the second connection member 44, it is possible to avoid a situation in which strong vibrations simultaneously act on both the inner joint portion 51 and the outer joint portion 52. Further, also in the first connection member 41, the first lead wire 35 and the third lead wire 37 demonstrate different resonance characteristics. As a result, it is possible to avoid a situation in which strong vibrations simultaneously act on both the inner joint portion 51 and the outer joint portion 52 of the first connection member 41.

Figure 12:
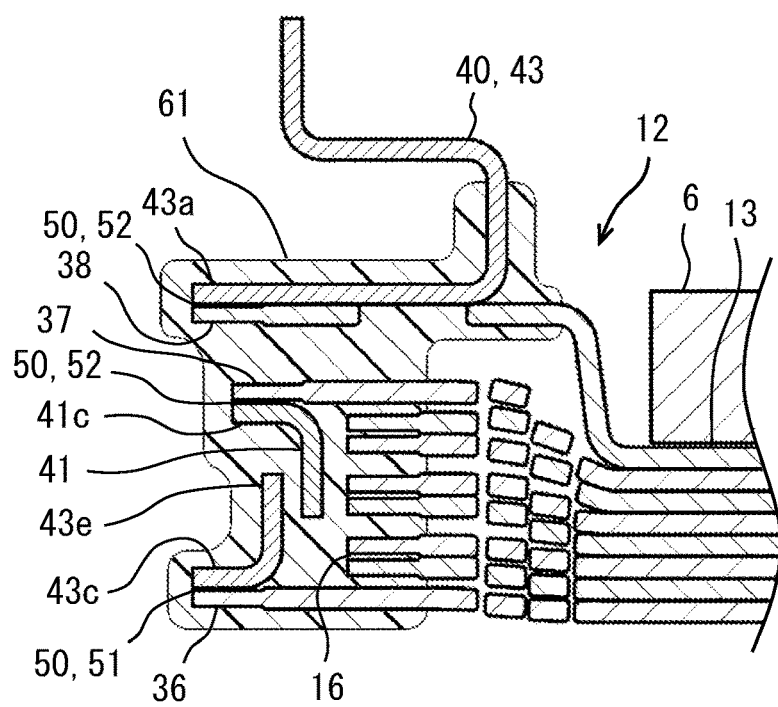
FIG. 12 is an enlarged cross-sectional view showing a bridge member in the stator.

In FIG. 12, the coil end 12 includes a bridge member 61. In FIGS. 1 to 11, exposed coil end 12 are illustrated. In the embodiment, the coil end 12 is provided with a bridge member 61. The bridge member 61 thermally bridges between the first connection member 41 and the second connection members 42, 43 and 44. That is, the bridge member 61 provides a heat transfer path between the first connection member 41 and the second connection members 42, 43 and 44. The bridge member 61 thermally bridges between the first connection member 41 and the second connection members 42, 43 and 44. As a result, the first connection member 41 and the second connection members 42, 43 and 44 behave as integrally connected members with respect to vibration.

The bridge member 61 is resin which has an electrical insulation property. The bridge member 61 may be glass, ceramics, or the like which has an electrical insulation property. The bridge member 61 is also called a protective resin. It is desirable that the bridge member 61 has a high thermal conductivity. It is desirable that the bridge member 61 has flexibility for suppressing vibration transfer. The bridge member 61 is applied by powder coating.

The bridge member 61 covers a plurality of joint portions 16 at the coil end 12. The bridge member 61 connects a plurality of joint portions 16 to each other. As a result, the bridge member 61 protects the plurality of joint portions 16 in an electrically insulated state. Further, the bridge member 61 also mechanically protects the plurality of joint portions 16. Note that FIG. 12 illustrated the plurality of joint portions 16 as a state before joining.

The bridge member 61 covers at least a part of each of the plurality of connection members 40. The bridge member 61 connects a plurality of connection members 40 to each other. The bridge member 61 connects the first connection member 41 and the second connection members 42, 43 and 44. The bridge member 61 forms a bridge between the first connection member 41 and the second connection members 42, 43 and 44. As a result, the bridge member 61 protects the plurality of connection members 40 in an electrically insulated state. Further, the bridge member 61 also mechanically protects the plurality of connection members 40. In addition, the bridge member 61 promotes heat transfer between the plurality of connection members 40. The bridge member 61 promotes, for example, heat transfer from the first connection member 41 to the second connection members 42, 43 and 44.

The bridge member 61 covers a plurality of joint portions 50. As a result, the bridge member 61 protects the plurality of joint portions 50 in an electrically insulated state. Further, the bridge member 61 also mechanically protects the plurality of joint portions 50.

The bridge member 61 connects the third lead wire 37 and the fourth lead wire 38. As a result, the deformation of the fourth lead wire 38 is suppressed.

Figure 13:
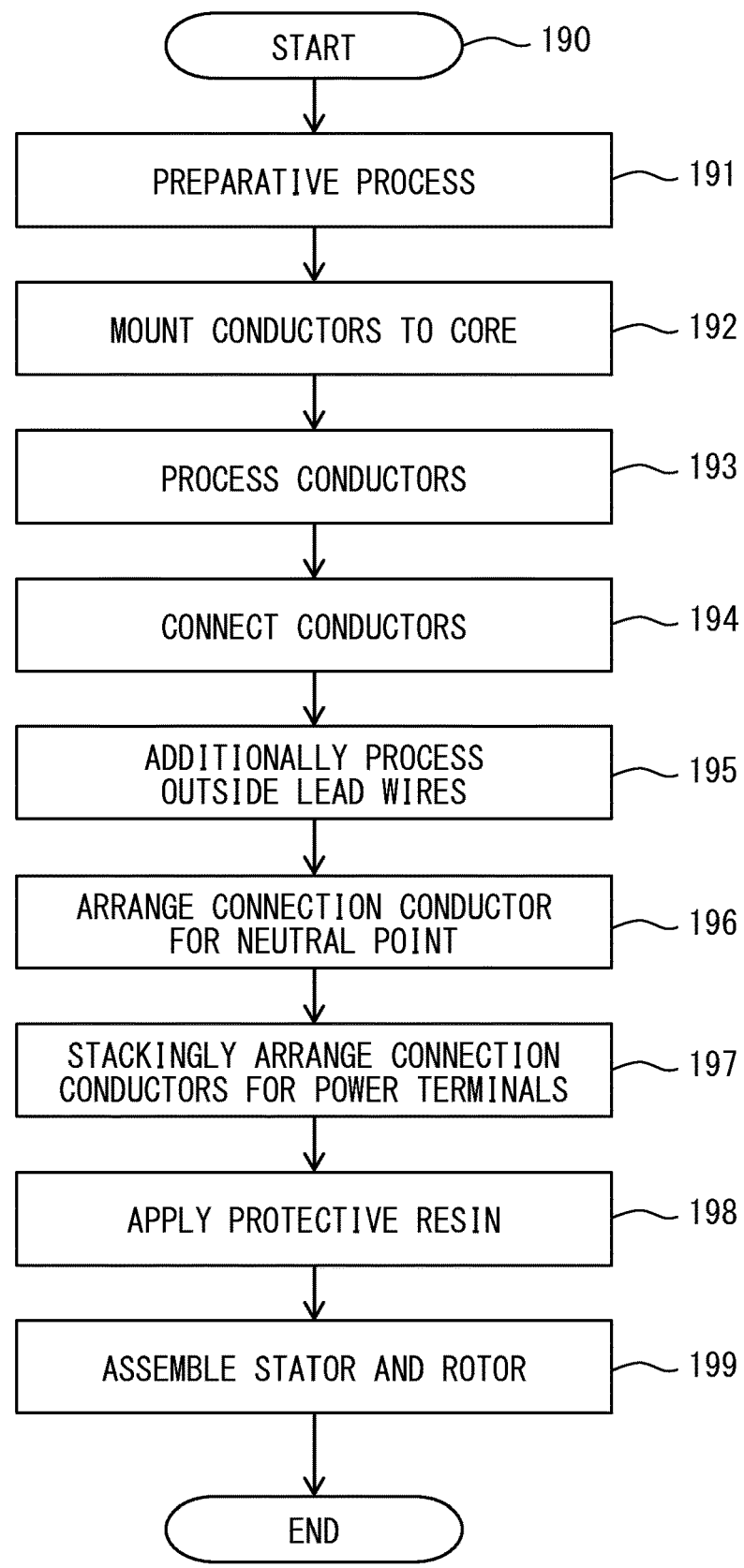
FIG. 13 is a flowchart showing a method of manufacturing a rotary electric machine.

In FIG. 13, a manufacturing method 190 of the rotary electric machine includes step 191 of preparing a plurality of parts. In the step 191 the rotor 2 and the housing 5 are prepared respectively. In the following steps, the steps to prepare the stator 3 is described in detail. Each step may be also called process.

In step 192, the plurality of segment conductors are mounted on the stator core 6. The step 192 provides a mounting step of mounting the stator coil 7 on the stator core 6 so as to form a coil end 12 projecting from the end of the stator core 6.

In the step 193, the plurality of segment conductors are processed at the coil end 12. In step 193, the plurality of segment conductors are positioned at positions forming the plurality of joint portions 16. In the step 193, the plurality of lead wires 30 are also processed. In the step 193, the plurality of first lead wires 35, the plurality of second lead wires 36, and the plurality of third lead wires 37 are processed into a shape similar to the segment conductor for the coil end 12. The plurality of first lead wires 35, the plurality of second lead wires 36, the plurality of third lead wires 37, and the segment conductors for the coil end 12 are different in heights. In step 194, a plurality of joint portions 16 are formed. In the step 194, the plurality of segment conductors are connected to provide a plurality of phase windings.

The step 193 provides an inner leading step which forms the inner lead wire 31. In the step 193, the inner lead wire 31 extends out from a predetermined position with respect to the radial direction at the coil end 12 by being bent M times. The inner leading step is a step of bending the inner lead wire 31 at the most inside of the basic width W12. The inner leading step is a step of arranging the inner lead wire 31 over from the stator core 6 to a predetermined height HG34 through a first path having a predetermined length.

In step 195, the fourth lead wire 38 positioned on a radial direction outside of the coil end 12 is additionally processed. In the step 195, the fourth lead wire 38 is additionally processed to obtain the shapes illustrated in FIGS. 9, 10, and 11. The step 195 includes more bending steps than the other lead wires. Moreover, step 195 includes a bending step of bending the lead wire with respect to the radial direction RD. The step 195 may be performed before step 194.

The step 195 provides an outer leading step which forms a fourth lead wire 38, which is one of the outer lead wires. In the step 195, the fourth lead wire 38 is extended out from a position on an outer side with respect to the radial direction RD than the inner lead wire 31 at the coil end 12 by being bent N times which is more than M. The outer leading step includes a radial direction bending step which bends the fourth lead wire 38, which is an outer lead wire, toward the radial direction outer side than the basic width W12. The outer leading step is a step of arranging the fourth lead wire 38 over from the stator core 6 to the height HG34 through a second path having a length longer than the predetermined length.

In step 196, the first connection member 41 for the neutral point is arranged. In the step 196, the first connection member 41 is positioned on the axial direction AD of the coil end 12. Further, in the step 196, the first connection member 41 and the plurality of first lead wires 35, and the first connection member 41 and the plurality of third lead wires 37 are joined by the plurality of joint portions 50. The step 196 is also a step of connecting the first connection member 41 and the plurality of low lead wires 33. The step 196 is also a step of connecting the first connection member 41 and the plurality of inner lead wires 31, and the first connection member 41 and the plurality of outer lead wires 32.

In step 197, the second connection members 42, 43 and 44 for the power end are arranged. In the step 197, the second connection members 42, 43 and 44 are arranged in a stacking manner on the first connection member 41. In the step 197, the second connection members 42, 43 and 44 are positioned over from the radial direction outside to the axial direction outside of the coil end 12. Further, in the step 197, the second connection members 42, 43 and 44 and the plurality of second lead wires 36, and the second connection members 42, 43 and 44 and the plurality of fourth lead wires 38 are joined by the plurality of joint portions 50. In the step 197, the second connection members 42, 43 and 44 and the plurality of high lead wires 34 are connected. The step 197 is also a step of connecting the second connection member 42, 43 and 44 and the plurality of inner lead wires 31, and the second connection member 42, 43 and 44 and the plurality of outer lead wires 32. The step 196 and/or the step 197 provide a connecting step of connecting the inner lead wire 31 and the outer lead wire 32 to the connection member 40. The step 197 may be performed before the step 196.

In step 198, the bridge member 61 is applied to the coil end 12. In step 199, the rotary electric machine 1 is assembled by assembling the rotor 2, the stator 3, and the housing 5.

According to the embodiment described above, each of the plurality of connection members 40 is stably supported by the inner lead wire 31 and the outer lead wire 32. Further, a rotary electric machine and a stator thereof having excellent heat release are provided. As a result, the connection member 40 provides a thermal path which provides good heat conduction between the inner lead wire 31 and the power terminal 8. The heat path includes heat transfer by the plurality of second connection members 42, 43 and 44. The heat path may go through indirect heat transfer between the first connection member 41 and the plurality of second connection members 42, 43 and 44.

According to the embodiment described above, the plurality of connection members 40 are supported by the inner lead wire 31 and the outer lead wire 32 which demonstrate different vibration characteristics. As a result, vibration at the plurality of joint portions 50 is suppressed. Further, the plurality of connection members 40 are supported by the inner lead wire 31 at the most inside with respect to the radial direction RD and the outer lead wire 32 at the most outside with respect to the radial direction RD. As a result, vibration at the plurality of joint portions 50 is remarkably suppressed. In particular, the fourth lead wire 38, which is one of the outer lead wires 32, is arranged on a radial direction outer side than the basic width W12 of the coil end 12. As a result, vibration at the plurality of joint portions 50 associated with the second connection members 42, 43 and 44 connected to the fourth lead wire 38 is suppressed.

Second Embodiment

This embodiment is a modification based on the preceding embodiments. In the above embodiment, the bridge member 61 is applied to a wide range of the coil end 12. Alternatively, the bridge member 61 may be applied to a part of the coil end 12. A range covered by the bridge member 61 may be adjusted by adjusting a range to which the bridge member 61 is applied. The bridge member 61 is applied to a portion preheated in the powder coating process.

Figure 14:
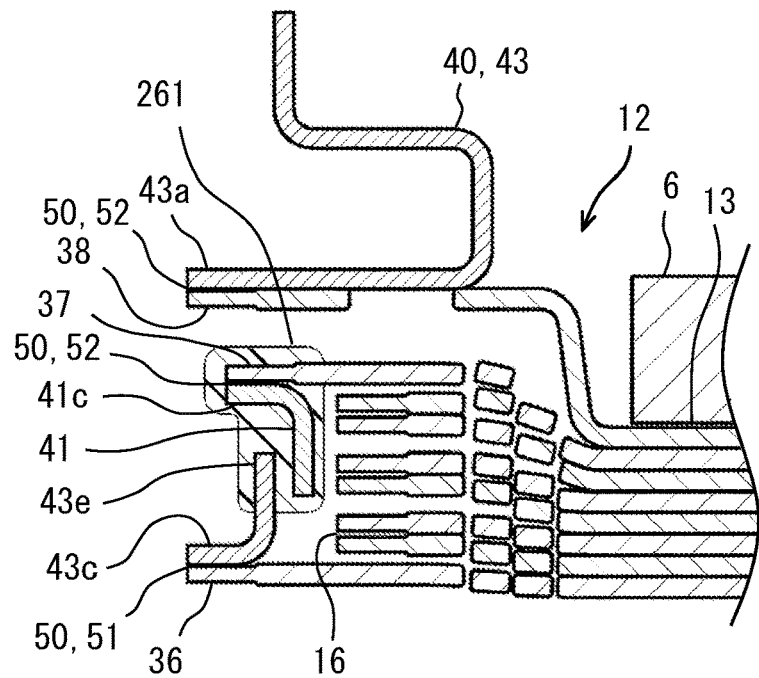
FIG. 14 is an enlarged cross-sectional view showing a bridge member according to a second embodiment.

In FIG. 14, the bridge member 261 is applied to the outer joint portion 52 associated with the third lead wire 37. Further, the bridge member 261 is applied to cover a part of the first connection member 41 and the second connection members 42, 43 and 44. The bridge member 261 forms a bridge between the first connection member 41 and the second connection members 42, 43 and 44. The bridge member 261 promotes indirect heat transfer between the first connection member 41 and the second connection members 42, 43 and 44. In the embodiment of FIGS. 14 to 19, the resin material applied to the plurality of joint portions 16 is not illustrated. The plurality of joint portions 16 may or may not be covered with the resin material.

Third Embodiment

Figure 15:
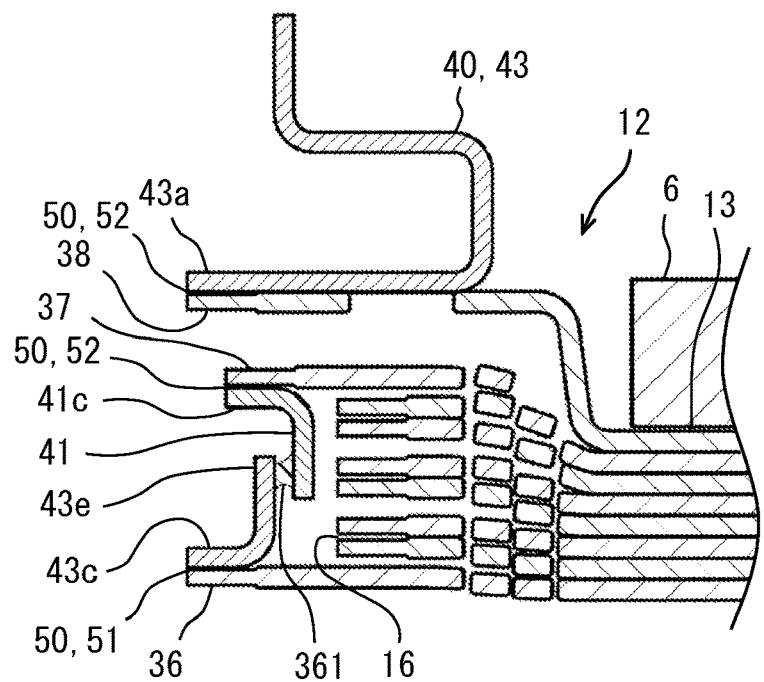
FIG. 15 is an enlarged cross-sectional view showing a bridge member according to a third embodiment.

This embodiment is a modification based on the preceding embodiments. In FIG. 15, the bridge member 361 is applied only between the first connection member 41 and the second connection members 42, 43 and 44. The bridge member 361 forms a bridge between the first connection member 41 and the second connection members 42, 43 and 44. The bridge member 361 promotes indirect heat transfer between the first connection member 41 and the second connection members 42, 43 and 44.

Fourth Embodiment

Figure 16:
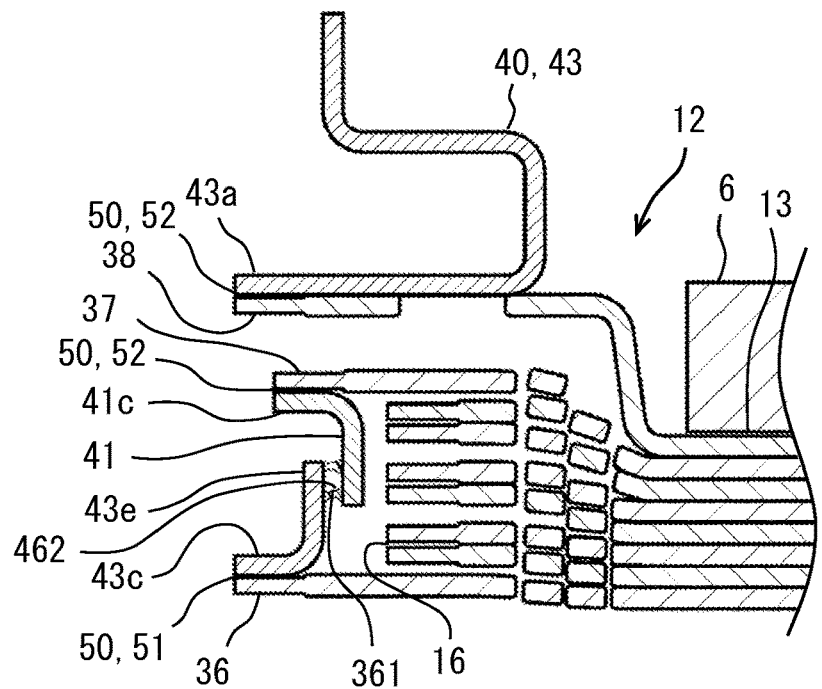
FIG. 16 is an enlarged cross-sectional view showing a bridge member according to a fourth embodiment.

This embodiment is a modification based on the preceding embodiments. In FIG. 16, the bridge member 361 is applied only between the first connection member 41 and the second connection members 42, 43 and 44. The bridge member 361 forms a bridge between the first connection member 41 and the second connection members 42, 43 and 44. Further, the bridge member 361 may have voids 462 such as air bubbles.

Fifth Embodiment

Figure 17:
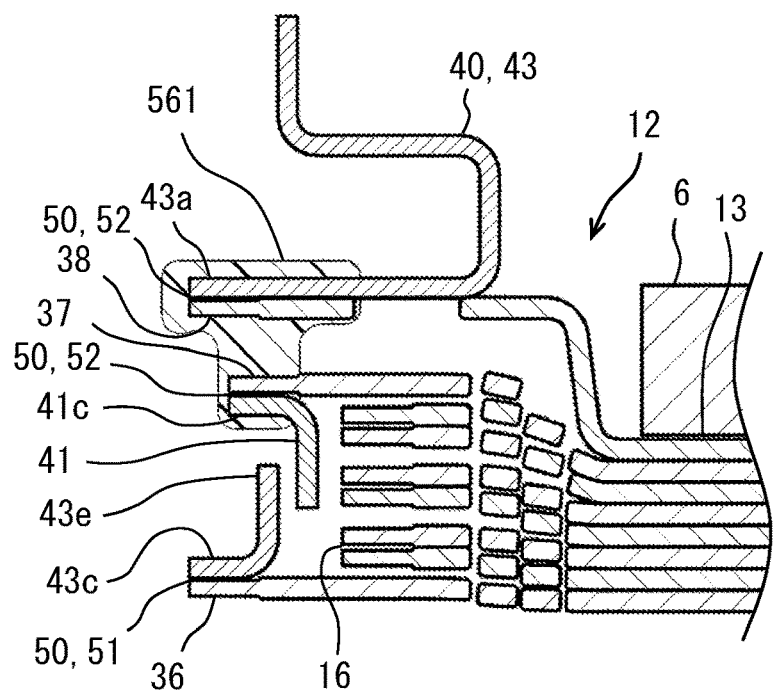
FIG. 17 is an enlarged cross-sectional view showing a bridge member according to a fifth embodiment.

This embodiment is a modification based on the preceding embodiments. In FIG. 17, the bridge member 561 is applied only to the outer joint portion 52. The bridge member 561 forms a bridge extending in the radial direction RD between the first connection member 41 and the second connection members 42, 43 and 44. The bridge member 561 promotes indirect heat transfer between the first connection member 41 and the second connection members 42, 43 and 44.

Sixth Embodiment

Figure 18:
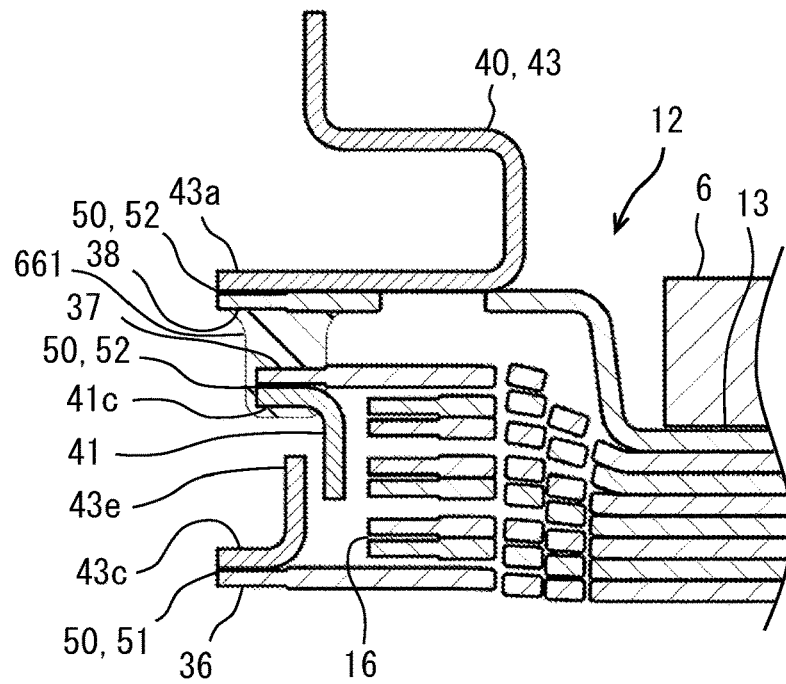
FIG. 18 is an enlarged cross-sectional view showing a bridge member according to a sixth embodiment.

This embodiment is a modification based on the preceding embodiments. In FIG. 18, the bridge member 661 is applied to the outer joint portion 52 associated with the third lead wire 37. Further, the bridge member 661 is applied only between the outer joint portion 52 associated with the third lead wire 37 and the fourth lead wire 38. The bridge member 661 forms a bridge extending in the radial direction RD between the first connection member 41 and the fourth lead wire 38. The bridge member 661 promotes indirect heat transfer between the first connection member 41 and the fourth lead wire 38.

Seventh Embodiment

Figure 19:
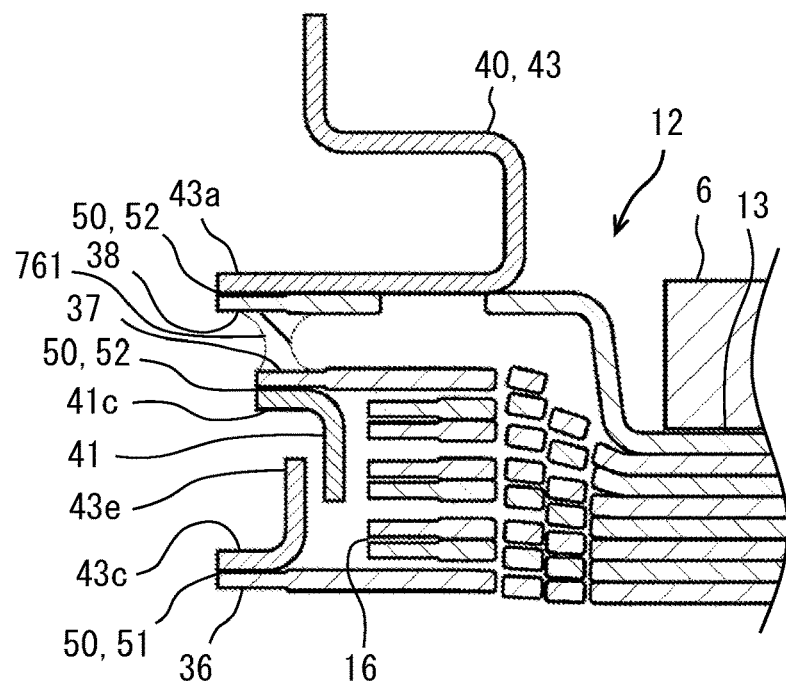
FIG. 19 is an enlarged cross-sectional view showing a bridge member according to a seventh embodiment.

This embodiment is a modification based on the preceding embodiments. In FIG. 19, the bridge member 761 is applied only between the third lead wire 37 and the fourth lead wire 38. The bridge member 761 forms a bridge extending in the radial direction RD between the third lead wire 37 and the fourth lead wire 38. The bridge member 761 promotes indirect heat transfer between the third lead wire 37 and the fourth lead wire 38.

Eighth Embodiment

This embodiment is a modification based on the preceding embodiments. In the above embodiment, the plurality of connection members 40 are arranged in an arc range RG40. Alternatively, the plurality of connection members 40 may be arranged in an arc range RG840. The arc range RG840 is wider than the arc range RG40. The arc range RG840 is set to be equal to a half circumference of the stator core 6 or smaller than the half circumference. Such an arrangement is possible by adjusting a position of the lead wire 30 in the stator coil 7.

Figure 20:
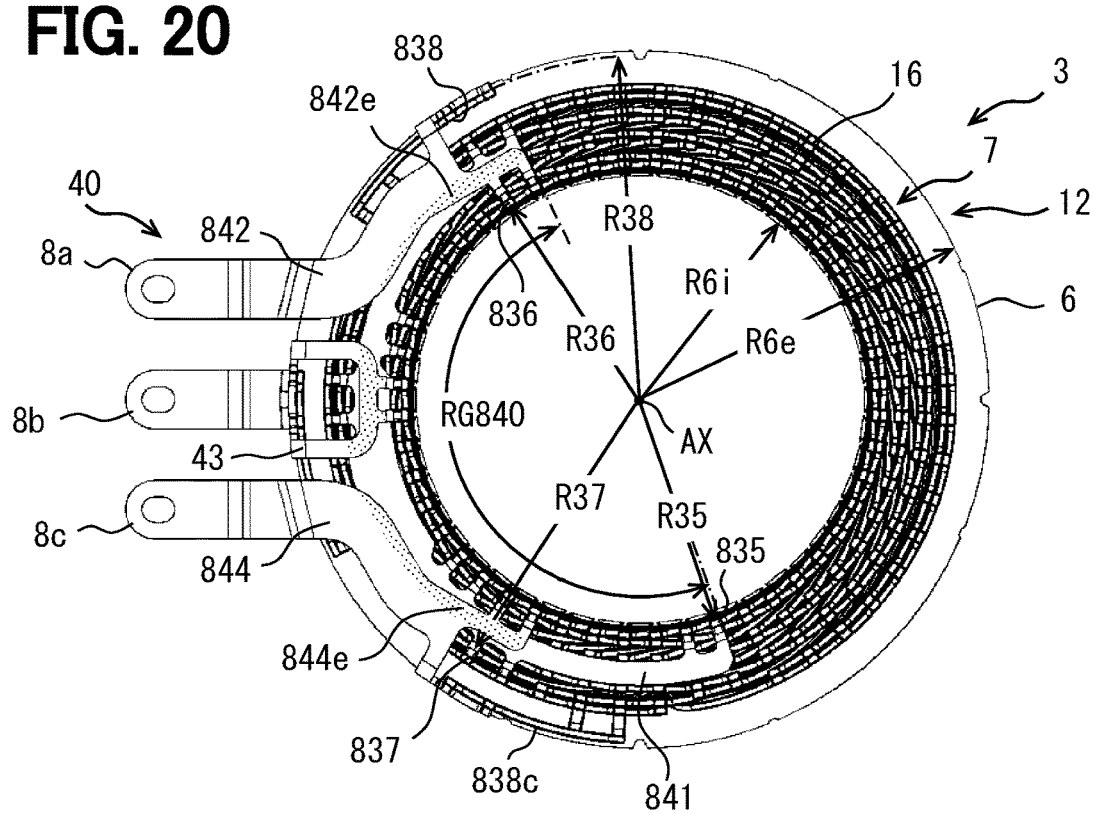
FIG. 20 is a plan view showing a stator according to an eighth embodiment.

In FIG. 20, the plurality of connection members 40 are arranged in the arc range RG840. The plurality of second connection members 842, 43, 844 are dispersedly arranged in the arc range RG840. A plurality of first lead wires 835, a plurality of second lead wires 836, a plurality of third lead wires 837, and a plurality of fourth lead wires 838 are also dispersedly arranged in the arc range RG840. The first connection member 841 extends over the arc range RG840. The second connection member 842 and the second connection member 844 extend longer along the first connection member 841. The second connection member 842 has a plate-shaped portion 842e illustrated by a dot pattern. The second connection member 844 has a plate-shaped portion 844e illustrated by a halftone dot pattern.

Figure 21:
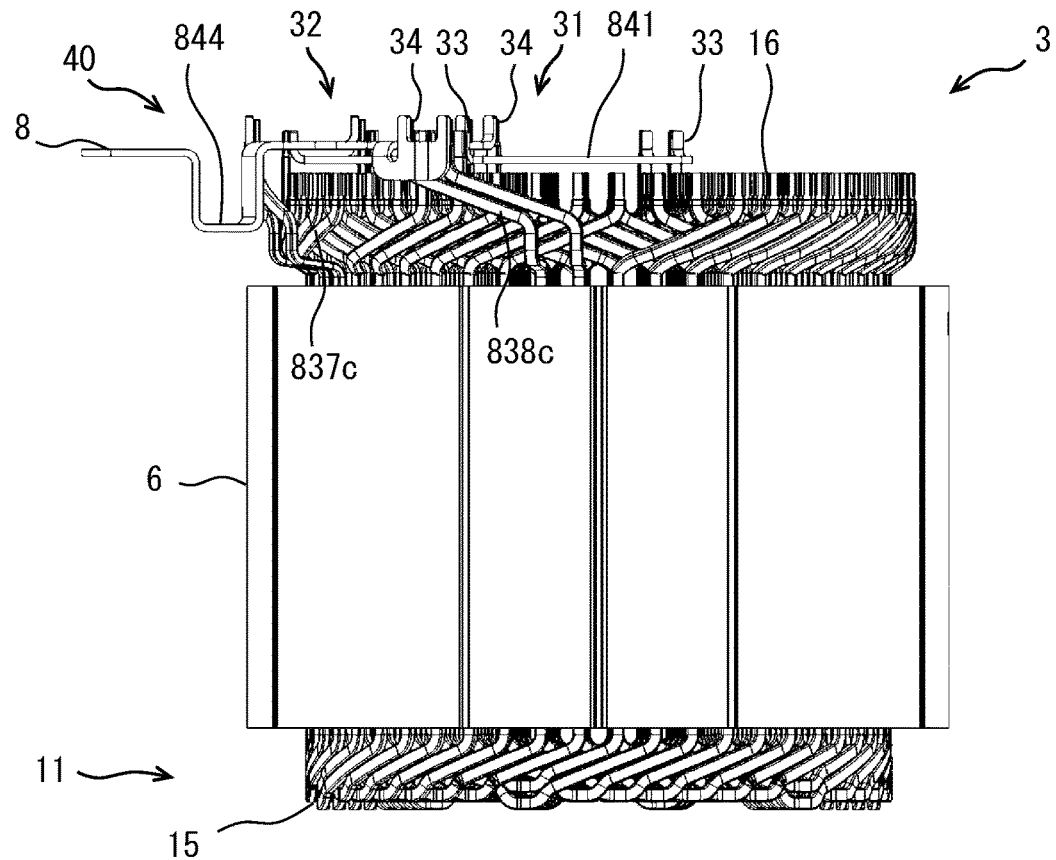
FIG. 21 is a side view of the stator.
Figure 22:
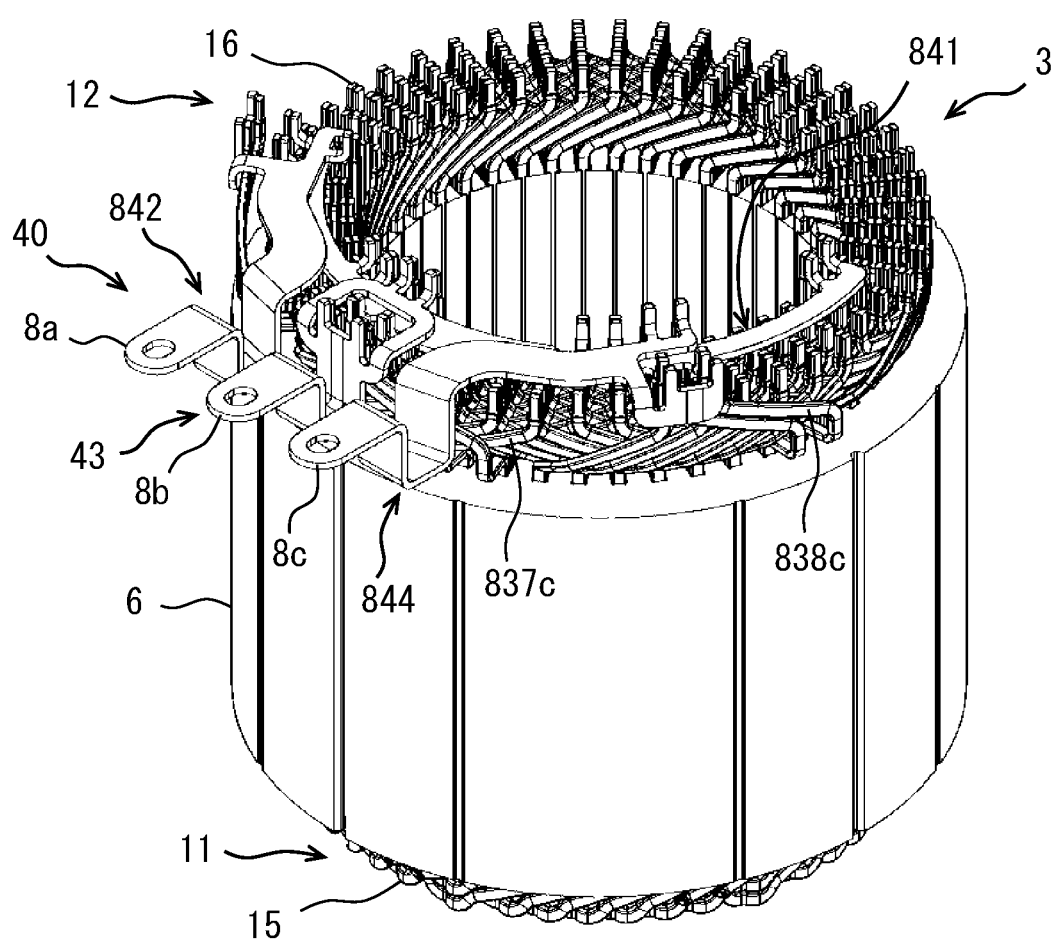
FIG. 22 is a perspective view showing the stator.

In FIGS. 21 and 22, an oblique portion 837c of the third lead wire 837 and an oblique portion 838c of the fourth lead wire 838 are illustrated. Also in this embodiment, the oblique portion 838c is inclined in the opposite direction to the oblique portion 837c. The oblique portion 838c and the oblique portion 837c are inclined in opposite directions.

Figure 23:
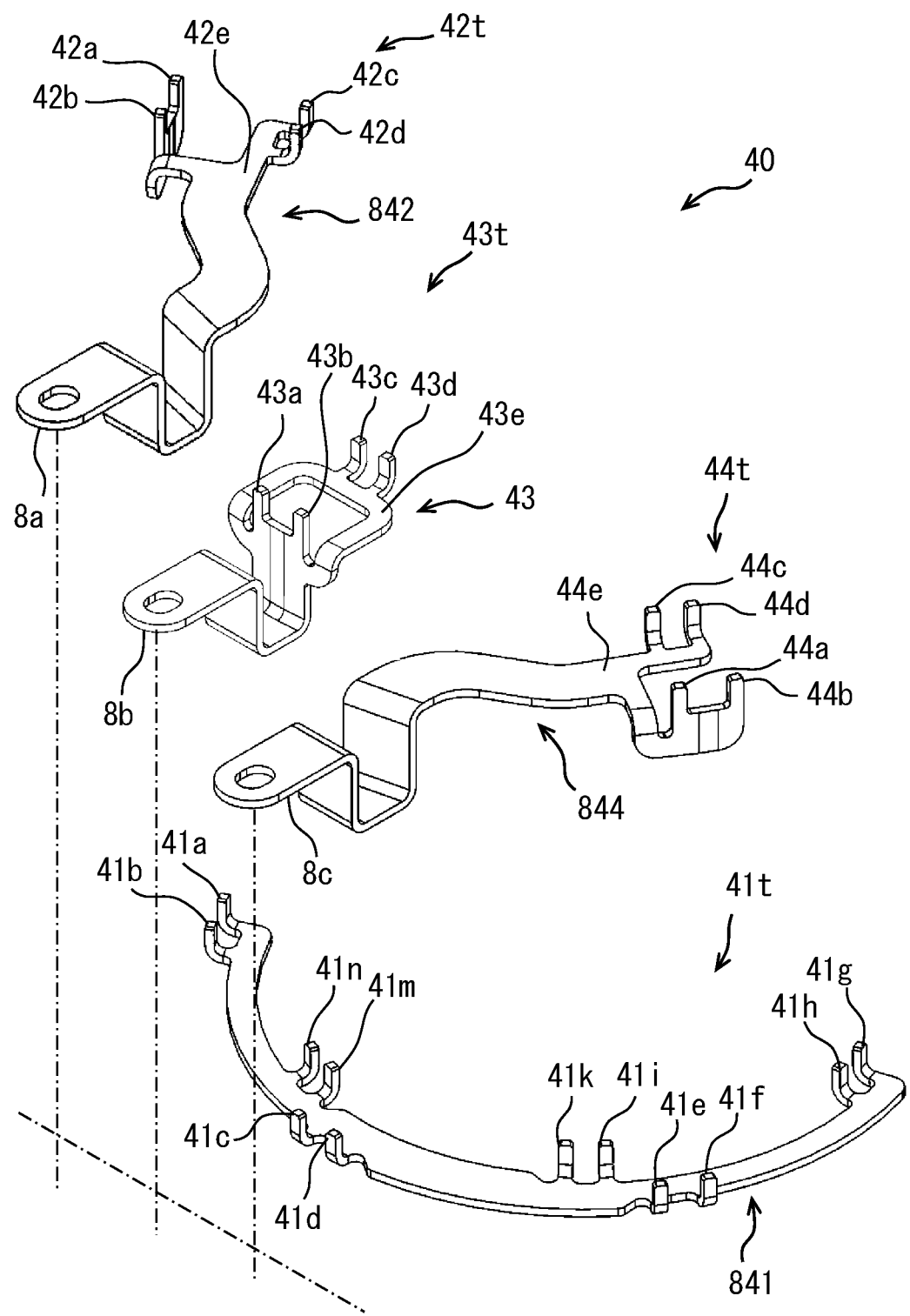
FIG. 23 is an exploded perspective view showing the connection members.

In FIG. 23, the first connection member 841, the second connection member 842, and the second connection member 844 extends longer in the circumferential direction CD than the first connection member 41, the second connection member 42, and the second connection member 44 in the preceding embodiments.

According to this embodiment, even if the power terminal 8 and the inner lead wire 31 are separated from each other with respect to the circumferential direction CD, the plurality of connection members 40 provide a heat transfer path between the inner lead wire 31 and the power terminal 8. Further, each of the plurality of connection members 40 is stably supported by the inner lead wire 31 and the outer lead wire 32.

Other Embodiments

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional members which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

What is claimed is:

1. A stator of a rotary electric machine, comprising:
   a stator core; and
   a stator coil mounted on the stator core and having a coil end protruding from an end of the stator core; and
   a connection member electrically and mechanically connected to a lead wire which extends out from the coil end,
   wherein the lead wire includes:
      an inner lead wire which extends out from a predetermined position with respect to a radial direction at the coil end and has M bent portions; and
      an outer lead wire which extends further outward from a position on an outside, with respect to the radial direction, than the inner lead wire at the coil end and has N bent portions more than M,
   wherein the connection member comprises:
      a first connection member which provides a neutral point; and
      a second connection member having a power terminal, wherein the inner lead wire and the outer lead wire are connected to the second connection member, wherein the second connection member is a plurality of second connection members corresponding to a plurality of phase windings, wherein the plurality of second connection members have plate-shaped portions which are arranged with the first connection member in a stacking manner with respect to an axial direction, and are dispersedly arranged in a circumferential direction, wherein the inner lead wire includes a plurality of inner lead wires arranged on an innermost side of a minimum width which is required to join a plurality of segment conductors providing the stator coil at the coil end and connected to each of the second connection members, and wherein the outer lead wire includes a plurality of outer lead wires arranged further outward, with respect to the radial direction, than the minimum width and is connected to each of the second connection members.

2. The stator of a rotary electric machine according to claim 1, wherein
the inner lead wire and the outer lead wire are lead wires of the same phase winding.

3. The stator of a rotary electric machine according to claim 1, wherein
the inner lead wire and the outer lead wire are arranged on the same diameter line of the stator core and are separated from each other in the radial direction.

4. The stator of a rotary electric machine according to claim 1, wherein
a bridge member, which has an electrical insulation property and bridges between the first connection member and the second connection member.

5. A rotary electric machine, comprising:
the stator of the rotary electric machine according to claim 1; and
a housing which accommodates the stator.

6. A manufacturing method of a stator of a rotary electric machine, comprising:
a mounting step of mounting a stator coil to a stator core so as to form a coil end protruding from an end portion of the stator core;
an inner leading step of leading out an inner lead wire by bending M times from a predetermined position in a radial direction at the coil end, the inner lead wire comprising a plurality of inner lead wires;
an outer leading step of leading out an outer lead wire from a position outside the inner lead wire in the radial direction at the coil end by bending the outer lead wire N times more than M, the outer lead wire comprising a plurality of outer lead wires;
a connecting step of connecting the inner lead wire and the outer lead wire to a connection member, wherein the connection member comprises: a first connection member which provides a neutral point; and a second connection member having a power terminal, and wherein the second connection member comprises: a plurality of second connection members corresponding to a plurality of phase windings, and the plurality of second connection members have plate-shaped portions;

in the connecting step, connecting the inner lead wire and the outer lead wire to the second connection member of the connection member;

in an arranging step, arranging the plate-shaped portions with the first connection member in a stacking manner with respect to an axial direction, and dispersedly arranging the plate-shaped portions in a circumferential direction;

in the inner leading step, arranging the plurality of inner lead wires on an innermost side of a minimum width which is required to join a plurality of segment conductors providing the stator coil at the coil end and connected to each of the second connection members; and in the outer leading step, arranging the plurality of outer lead wires further outward, with respect to the radial direction, than the minimum width and connecting the plurality of outer lead wires to each of the second connection members.

7. The manufacturing method of a stator of a rotary electric machine according to claim 6, wherein
the inner leading step includes a step of bending the inner lead wire at the innermost side of the minimum width required to join the plurality of segment conductors providing the stator coil at the coil end, and
the outer leading step includes a radial direction bending step of bending the outer lead wire outward in the radial direction from the minimum width.

8. The manufacturing method of a stator of a rotary electric machine according to claim 6, wherein
the inner leading step includes a step of arranging the inner lead wire over from the stator core to a predetermined height through a first path having a predetermined length, and
the outer leading step includes a step of arranging the outer lead wire over from the stator core to the height through a second path longer than the predetermined length.

* * * * *